United States Patent
Takeuchi et al.

(10) Patent No.: US 6,542,658 B2
(45) Date of Patent: Apr. 1, 2003

(54) OPTICAL SWITCH

(75) Inventors: Yukihisa Takeuchi, Nagoya (JP); Tsutomu Nanataki, Nagoya (JP); Koji Kimura, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/799,329

(22) Filed: Mar. 5, 2001

(65) Prior Publication Data

US 2002/0081059 A1 Jun. 27, 2002

Related U.S. Application Data

(63) Continuation-in-part of application No. 09/749,068, filed on Dec. 27, 2000, now abandoned.

(51) Int. Cl.[7] .................................................. G02B 6/26
(52) U.S. Cl. ......................................... 385/18; 385/14
(58) Field of Search ..................... 385/14, 47, 16–22

(56) References Cited

U.S. PATENT DOCUMENTS

| 5,253,319 A | * 10/1993 | Bhagavatula | ............... 385/129 |
| 6,389,189 B1 | * 5/2002 | Edwards et al. | ............... 385/17 |
| 6,408,112 B1 | * 6/2002 | Bartels | ........................ 385/16 |

FOREIGN PATENT DOCUMENTS

| JP | 10-090735 | 4/1998 |
| JP | 11-202222 | 7/1999 |

* cited by examiner

*Primary Examiner*—Hung N. Ngo
(74) *Attorney, Agent, or Firm*—Burr & Brown

(57) ABSTRACT

An optical switch has at least a light transmission portion, an optical path-changing portion, and an actuator portion. The light transmission portion has a light reflecting plane on at least one part of a surface facing the optical path-changing portion to totally reflect light; and light transmission channels having optical wave guiding bodies and being provided in at least three directions with the light reflecting plane as a starting point. The optical path-changing portion is provided in proximity to the light reflecting plane of the light transmission portion in a movable condition and has a light introduction member made of a translucent material and a light reflection member for totally reflecting light. The actuator portion has a mechanism that is displaced by external signals and transmits the displacement to the optical path-changing portion. The optical path-changing portion is contacted or separated from the light reflecting plane of the light transmission portion by displacement of the actuator portion in response to the external signals. An optical path where light input to the light transmission channels is totally reflected at the light reflecting plane of the light transmission portion and is transmitted to a specific light transmission channel on an output side, is switched to another optical path where light input to the light transmission channel is taken to the light introduction member, and is totally reflected at the light reflection member and is transmitted to a specific light transmission channel on the output side.

30 Claims, 22 Drawing Sheets

OPTICAL SWITCH

CROSS-REFERENCE OF RELATED APPLICATION

The present invention is a Continuation-in-Part Application of the U.S. Patent Application Ser. No. 09/749,068, filed on Dec. 27, 2000, now abandoned.

BACKGROUND OF THE INVENTION AND THE RELATED ART

The present invention relates to an optical switch. More specifically, the present invention relates to an optical switch suitable for an optical communication system, an optical storage device, an optical arithmetic unit, an optical recorder, an optical printer and so forth, particularly, for the optical communication system in which a multichannel optical switch is desired to perform switching for each specific beam.

With recent developments in optical communication technology, optical switches have been sought that allow high-speed response, size reduction, high integration, low power consumption, and reduction of signal attenuation.

Conventionally-known optical switches include the ones in which liquid crystal is used, optical fibers are moved by a mechanical device using an electromagnet, a micromirror is used and so forth.

However, the optical switch using liquid crystal performs switching on the basis of molecular orientation, so that the optical switch has been slow in response and has not been easily adapted to optical communication requiring high-speed communication. There also has been a problem in that utilization efficiency of light is low since a polarizing plate has to be employed.

In the optical switch in which optical fibers are moved by a mechanical device using an electromagnet, the device could not be reduced in size and it has been difficult to meet the demands for a high degree of integration. Additionally, there has been a problem in that power consumption is large as switching is performed by the mechanical operations of an electromagnet.

In the optical switch using a micromirror, the manufacturing process becomes complex and the manufacturing costs are thus high, which is troublesome. There also has been a problem in that attenuation of signals is large since propagating light in the atmosphere is controlled.

In addition to these optical switches, an optical switch is proposed that performs switching by utilizing the change in refractive indexes of optical waveguides due to electro-optic effects during the application of electric fields to the optical waveguides.

However, in this type of optical switch, there is a problem in that the switch is likely to be affected by electric fields applied by other switches so that other optical waveguides are controlled. Particularly, when an optical switch is reduced in size, electrodes to apply electric fields to each optical waveguide inevitably get close to each other, increasing the effect of electric fields between adjacent optical waveguides and generating errors due to crosstalk and so forth, which has been troublesome.

On the other hand, an optical switching element is proposed that has: a light guide portion for performing light transmission by confining light internally by total reflection; an optical switching portion for extracting the light trapped internally to the outside of the light guide portion when the portion is in contact with the light guide portion, and then reflecting the extracted light into the direction of the light guide portion; and a driving portion for driving the optical switching portion (Japanese Unexamined Patent Application Publication No. 11-202222).

However, this optical switching element is configured to let the light guide portion extend light transmission of input light only in one direction. At the same time, the switching element unintentionally outputs the light that is input to the light guide portion, to the outside by contacting the switching portion to an unspecific total reflecting plane of the light guide portion. In other words, the switch only turns light on or off. Accordingly, the following configurations cannot be achieved: a switching element as an optical switch that outputs specific input light after switching the optical path thereof to a specific plurality of output side ends; an optical switch that outputs a specific plurality of input light to specific output ends by switching each optical path of the input light; and a multichannel optical switch that outputs a specific plurality of input light after switching the input light to a specific plurality of output ends. Although the switching element may be applicable to objects such as an image display, it has been practically difficult to apply the switching element to an optical communication system.

Moreover, in addition to the configuration whereby the light guide portion extends light transmission only in one direction, the optical switching element is configured to utilize infinitely repeated total reflection of the light guide portion. Thus, an emitting direction at the switching portion, in consideration of refraction at an interface between atmosphere and the light guide portion, is restricted to a deeper angle than the total reflection angle thereof; in other words, an almost vertical direction to the total reflecting plane. Even in this sense, switching to transmit light into different directions for each specific light could not be performed.

Therefore, the object of the present invention is to provide an optical switch suitable for an optical communication system, that solves the problems of conventional optical switches, and allows for low power consumption, a high-speed response, size reduction and high integration, significant reduction of signal attenuation and, furthermore, switching per specific input light.

SUMMARY OF THE INVENTION

The present inventors, after thorough researches to solve the above-noted problems, have discovered that the object mentioned above may be achieved by providing a light transmission portion having optical transmission channels, consisting of optical wave guiding bodies, in at least three directions with a light reflecting plane at one part on a surface of a light transmission portion, facing an optical path-changing portion, as a starting point. The optical path-changing portion is contacted or separated from the light reflecting plane of the light transmission portion at wavelength levels of input light based on displacement of an actuator portion.

Specifically, according to the present invention, there is provided an optical switch including at least a light transmission portion, an optical path-changing portion, and an actuator portion. The light transmission portion has a light reflecting plane provided at least at one part of a plane facing the optical path-changing portion to totally reflect light. Light transmission channels are provided, which consist of optical wave guiding bodies, in at least three directions with the light reflecting plane functioning as a starting point. The optical path-changing portion is provided in proximity to the light reflecting plane of the light transmission portion in a movable condition and has a light introduction member made of a translucent material and a light reflection member for totally reflecting light. The actuator portion has a mechanism that is displaced by external signals and transmits the displacement to the optical path-changing portion. The optical path-changing portion is contacted or separated from the light reflecting plane of the light transmission portion by displacement of the actuator portion in response to external signals. An optical path where the light input to the light transmission channel is totally reflected at the light reflecting plane of the light transmission portion and is transmitted to a specific light transmission channel on an output side, is switched to another optical path where the light input to the light transmission channel is taken to the light introduction member, and is totally reflected at the light reflection member and is transmitted to a specific light transmission channel on an output side.

It is preferable, in the present invention, that the actuator portion has a piezoelectric/electrostrictive element including a piezoelectric/electrostrictive layer and at least one pair of electrodes arranged on one part of the piezoelectric/electrostrictive layer. A vibrating member is provided and is in contact with at least one part of the piezoelectric/electrostrictive element to support the piezoelectric/electrostrictive element and converts strain of the piezoelectric/electrostrictive layer into bending displacement or vibrations. A fixing member is provided to fix at least one part of the vibrating member so as to vibrate the vibrating member. A displacement transmission member is provided and is arranged between the optical path-changing portion and the piezoelectric/electrostrictive element based on needs, and transmits displacement of the piezoelectric/electrostrictive element to the optical path-changing portion.

It is preferable that a substrate of ceramics is constituted by unitarily sintering the vibrating member and the fixing member, and that a recessed portion or a hollow portion is formed in the substrate, which gives the vibrating member a thin structure. Moreover, the actuator may be a so-called stacked actuator composed of a laminated body in which an anode layer of linking multiple layers as anodes and a cathode layer of linking multiple layers as cathodes are alternately laminated on the piezoelectric/electrostrictive layer composed of ceramics therebetween.

In the present invention, it is more preferable that the light transmission portion includes two or more layers having different light refractive indexes, and that the light transmission channels of the light transmission portion include optical waveguides.

Additionally, the light transmission portion may be configured by joining at least two optical wave guiding bodies to one optical wave guiding body so as to form light transmission channels in at least three directions with the light reflecting plane of the light transmission portion acting as a starting point. On the other hand, in the present invention, it is preferable that a condenser lens or a collimator lens is arranged at each of a plurality of light-signal input ends and/or light-signal output ends of the light transmission portion, and that light signals are input and output through the condenser lens or the collimator lens.

Moreover, in the present invention, the light reflection member may be a light reflecting film that is integrally formed on a plane of the light introduction member on the side of the displacement transmission member.

Additionally, according to the present invention, a multichannel optical switch having a plurality of the optical switches mentioned above is provided.

As an embodiment in a multichannel optical switch of the present invention, a multichannel optical switch may be included in which each light transmission channel of a plurality of optical switches is formed of a single light transmission portion. The multichannel optical switch is configured to let a part of each light transmission channel share a part of channels by crossing each other.

Other embodiments in multichannel optical switches of the present invention may include the following examples. A switch can be provided in which a plurality of optical switches are constituted by linking one input-side channel to one output-side channel between adjacent optical switches, and switching the light input from input ends in an optical switch at each optical path-changing portion of a plurality of optical switches including the optical switch. A switch can be provided in which a plurality of optical switches are constituted by at least one optical switch having a plurality of input-side channels and at least one optical switch having a plurality of output-side channels and in which one input-side channel is linked to one output-side channel between adjacent optical switches, and switching the light input from input ends of a plurality of optical switches at the optical path-changing portion of the plurality of optical switches. A switch can be providing a having a plurality of optical switches in which one input-side channel is linked to one output-side channel between adjacent optical switches by means of optical fiber, and switching at least the light input from input ends in an optical switch at each optical path-changing portion of a plurality of optical switches, or the like.

In the present invention, the multichannel switch, furthermore, may include: the switch in which a plurality of the multichannel switches are arranged in a row; or the switch that has a plurality of the multichannel optical switches, and in which each multichannel optical switch is arranged by locating at least one part of output ends themselves of each light transmission channel in each multichannel optical switch in an arc condition with an input end in an outer light transmission channel, which is disposed separately from each multichannel optical switch, at a center.

Furthermore, the multichannel optical switch may include: the switch in which an optical coupler is joined to a light-signal output end of each light transmission channel in the multichannel optical switches to collect at least one part of light transmission channels; and the switch in which each output end or each input end of a plurality of the multichannel optical switches is linked to a plurality of input ends or output ends in at least another similar multichannel optical switch.

Moreover, in the multichannel optical switch of the present invention, it is preferable that each optical path-changing portion has a light reflection member and at least two kinds of light reflection angles are shared among the optical path-changing portions.

BRIEF DESCRIPTION OF THE DRAWINGS

FIG. 1(*a*) shows a state in which an optical path-changing portion is separated from a light transmission portion; FIG. 1(*b*) shows a state in which the optical path-changing portion is in contact with the light transmission portion; and FIG. 1(*c*) shows a plane facing the optical path-changing portion and a plane corresponding to the optical path-changing portion in the light transmission portion.

FIG. 10(a) shows an embodiment of a piezoelectric/electrostrictive element using a displacement in the Y direction, which is a direction of lamination.

DESCRIPTION OF THE PREFERRED EMBODIMENT

Figure 1A:
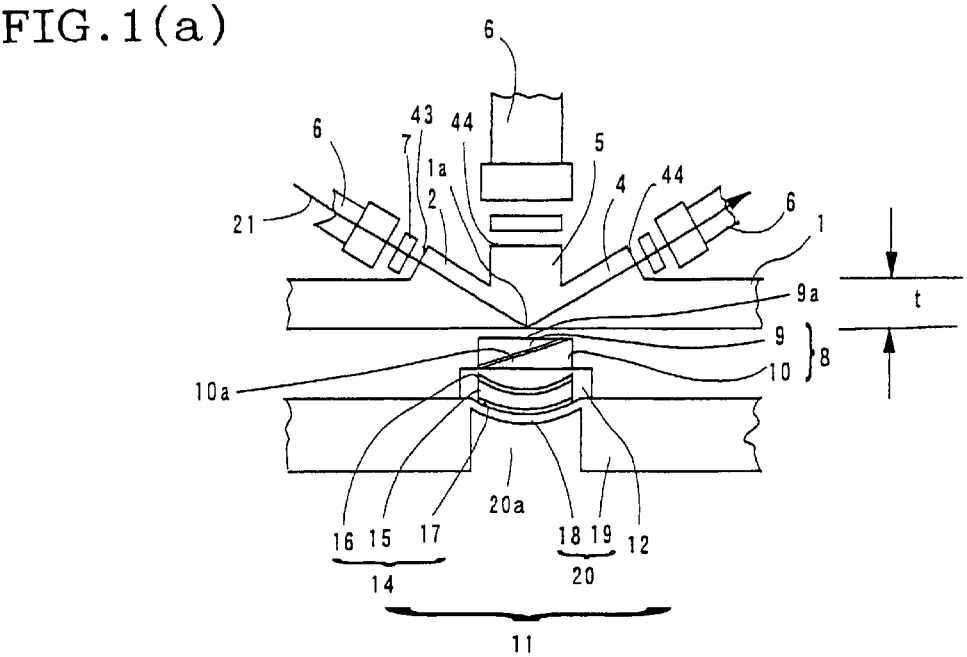
FIGS. 1(*a*), (*b*) and (*c*) are explanatory views, displaying one embodiment of an optical switch of the present invention.
Figure 1B:
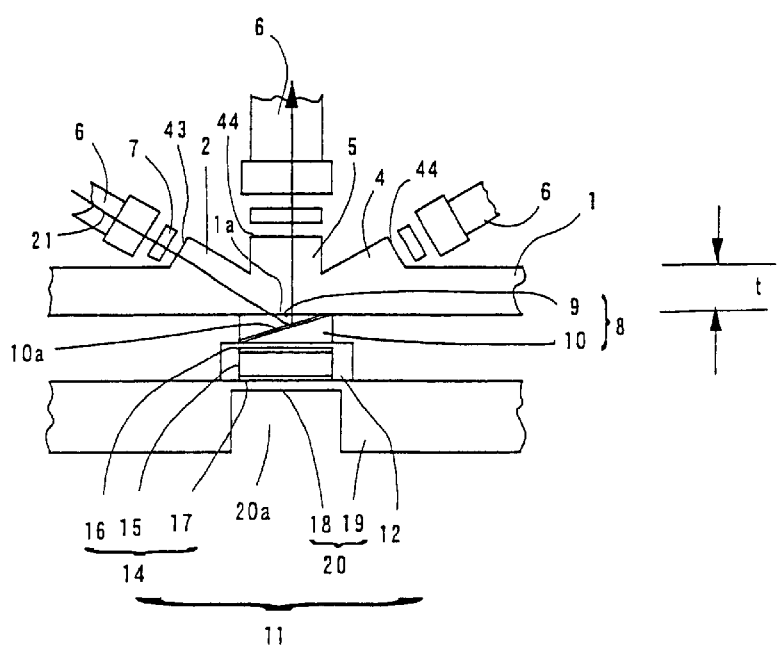
Figure 1C:
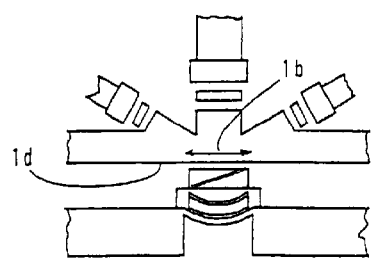

FIGS. 1(a), (b), and (c) are explanatory views schematically showing one embodiment of an optical switch of the present invention: FIG. 1(a) shows a state in which an optical path-changing portion is separated from a light transmission portion; FIG. 1(b) shows a state in which the optical path-changing portion is in contact with the light transmission portion; and FIG. 1(c) shows a plane facing the optical path-changing portion and a plane corresponding to the optical path-changing portion in the light transmission portion.

As shown in FIG. 1(a), under a condition where an actuator portion 11 is run by external signals such as voltage in the optical switch of one embodiment of the present invention, an optical path-changing portion 8 is separated from a light transmission portion 1 by displacement of the actuator portion 11. Light 21 that is input to light transmission channel 2 of the light transmission portion 1, is totally reflected at a light reflecting plane 1a of the light transmission portion 1 where a refractive index is adjusted to a predetermined value, without transmitting the light. The light is transmitted to one light transmission channel 4 on an output side.

On the other hand, when the actuator portion 11 is reversed to a non-operation state from this condition, the displacement of the actuator 11 is reset as shown in FIG. 1(b). A light introduction member 9 of the optical path-changing portion 8 contacts the light transmission portion 1 at a distance less than a wavelength of light. Thus, the light 21 input to the light transmission channel 2 is taken to the light introduction member 9 from the light transmission portion 1 by the light introduction member 9, and is transmitted through the light introduction member 9. The light 21 transmitted through the light introduction member 9 reaches a light reflection member 10. The light is reflected at a reflecting plane 10a of the light reflection member 10, and is transmitted to another output-side light transmission channel 5 in a direction different from the direction of the light reflected at the light reflecting plane 10a of the light reflection member 10.

The optical switch of the present invention shown in FIGS. 1(a), (b), and (c) performs optical switching. That is, the specific light 21 introduced into the light transmission channel 2 of the light transmission portion 1 may be transmitted to different light transmission channels 4, 5 by optionally switching an optical path based on external signals, such as voltage, to the actuator portion 11.

Thus, in the optical switch of the present invention, travelling directions of input light or output light may be varied. At the same time, each input light 21 may be reflected at the light reflecting plane 1a of the light transmission portion 1 or the light reflecting plane 10a of the optical path-changing portion 8, and may be transmitted to specific output-side transmission channels 4, 5 for each reflected light thereof. Thus, an optical switch may be achieved in which a great number of optical paths may be optionally selected for specific light. Additionally, the light transmission channels 4, 5 are switched not by the change in refractive indexes due to physical effects, for instance, electro-optic effects and so forth unique to a material, but by the mechanical operations of contacting or separating the optical path-changing portion 8 from the light transmission portion 1. Thus, not only the size may be reduced but also highly-integrated multichannel switches may be realized without causing problems such as crosstalk. Furthermore, the moving distance of the optical path-changing portion to perform switching is only in a wavelength order of light, so that high-speed switching may be performed. Moreover, since there is no need for moving the light transmission channels 2, 4, 5 themselves, switching can be performed with low power consumption. Also, optical switching may be basically performed in a closed space and there is no need for switching the light that transmits through the atmosphere, so that attenuation of signals relating to switching may be greatly restrained.

Embodiments of the present invention will be explained in detail below for each component based on the drawings.

1. Light Transmission Portion

As shown in FIGS. 1(*a*), (*b*), and (*c*), the light transmission portion 1 in the present invention has the light reflecting plane 1*a* that is provided at least at one part of a surface 1*d* facing the optical path-changing portion 8, described below, for reflecting light. The light transmission channels 2, 4, 5, which comprise of an optical wave guiding body, transmit light in at least three directions with the light reflecting plane 1*a* operating as a starting point. Accordingly, as described above, there is provided an optical switch in which multiple optical paths may be optionally selected for each specific light. Attenuation of signals relating to switching may be restrained to a high degree.

The light reflecting plane 1*a* arranged in the light transmission portion 1 of the present invention is required to include a part of the portion 1*b* corresponding to the optical path-changing portion 8, in a plane of surface 1*d* facing the optical path-changing portion 8 described below. However the light reflecting plane 1*a* may also include a plane other than a portion 1*b* corresponding to the optical path-changing portion 8. However, it is preferable that the light reflecting plane 1*a* includes the portion 1*b* corresponding to the optical path-changing portion 8 in order to switch light without any loss of input light.

In addition, the light reflecting plane 1*am* arranged in light transmission portion 1 to be a starting point of each of the light transmission channels 2, 4, 5, is required to be designed so as to include a plane where the light 21 input in the light transmission channel 2 projects, into the plane of surface 1*d* of the light transmission portion 1, which faces the optical path-changing portion 8 in consideration of disposition of each of the light transmission channels 2, 4, and 5. However, in the present invention, it is not required to make all of the plane 1*d* of the light transmission portion 1, which faces the optical path-changing portion 8, the light reflecting plane 1*a* so long as the light reflecting plane 1*a* includes a plane where the input light 21 projects.

The light transmission channels 2, 4, and 5 provided in the light transmission portion 1 of the present invention may include a plurality of light-signal input ends and/or light-signal output ends. For instance, a light transmission portion 1, as shown in FIGS. 1(*a*), (*b*), FIG. 2, consists of a single optical wave guiding body and is substantially formed with the light transmission channels 2, 4, 5 oriented toward at least three directions, with the light reflecting plane 1*a* of the light transmission portion 1 being a starting point by providing, at a part of the optical wave guiding body, a plurality of light-signal input ends 43 and/or light-signal output ends 44 having a face roughly orthogonal to the input and output direction of light.

Figure 3:
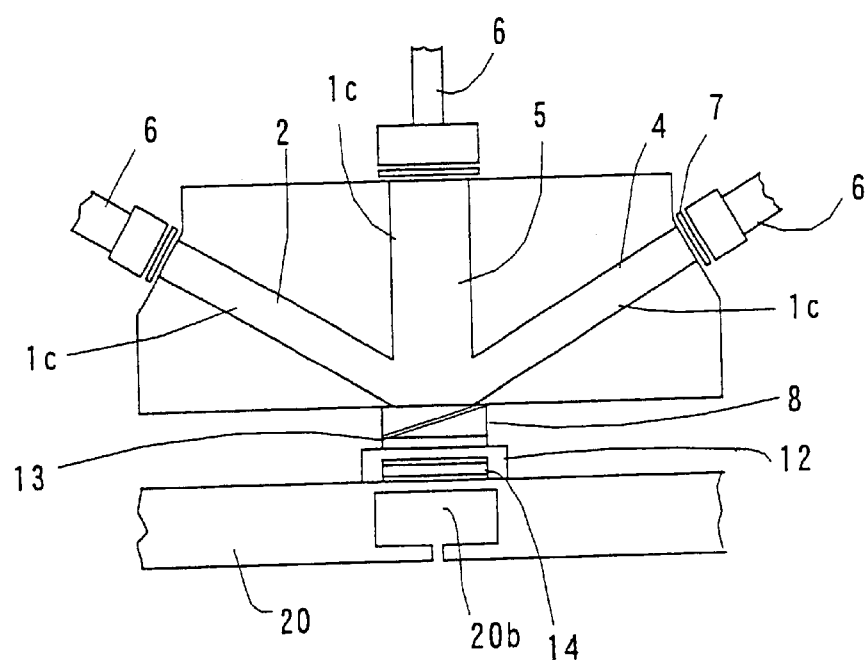
FIG. 3 is an explanatory view schematically showing another embodiment of an optical switch of the present invention.

However, as shown in FIG. 3, in the light transmission portion 1 of the present invention, the light transmission channels 2, 4, 5 are preferably formed by an optical waveguide 1*c*. If the light transmission channels 2, 4, 5 are formed by an optical waveguide 1*c*, light can be transmitted in a narrower space and the attenuation of signals that is troublesome in the case of long-distance communications, can be reduced to a high degree.

The optical switch of the present invention may be configured to directly input and output light between optical fibers 6 or the like and the light transmission portion 1 by joining the optical fibers 6 or the like to a plurality of light-signal input ends 43 and/or light-signal output ends 44 of the light transmission portion 1 with an adhesive (not illustrated) or the like. Or, the optical switch may be configured to input and output light between optical fibers 6 or the like and the light transmission portion 1 through prisms (not illustrated), by arranging the prisms at a plurality of the light-signal input ends 43 and/or the light-signal output ends 44 of the light transmission portion 1. However, it is preferable to configure the optical switch to input and output light between optical fibers 6 or the like and the light transmission portion 1 through lenses 7, by arranging the lenses 7, such as a condenser lens and a collimator lens at a plurality of the light-signal input ends 43 and/or the light-signal output ends 44 of the light transmission portion 1 as shown in FIGS. 1(*a*), (*b*), (*c*), FIG. 2. Thus, input and output loss due to light divergence is reduced. Particularly, in the optical switch in which the light transmission channels 2, 4, 5(3) composed of an optical wave guiding body are not restricted to a specific direction as shown in FIGS. 1(*a*), (*b*), (*c*), and FIG. 2, loss due to light divergence at the light transmission portion 1 is reduced. Thus, it is preferable to condense light by a condenser lens 7 and input and output the light between the lens and the light transmission portion 1.

Figure 2:
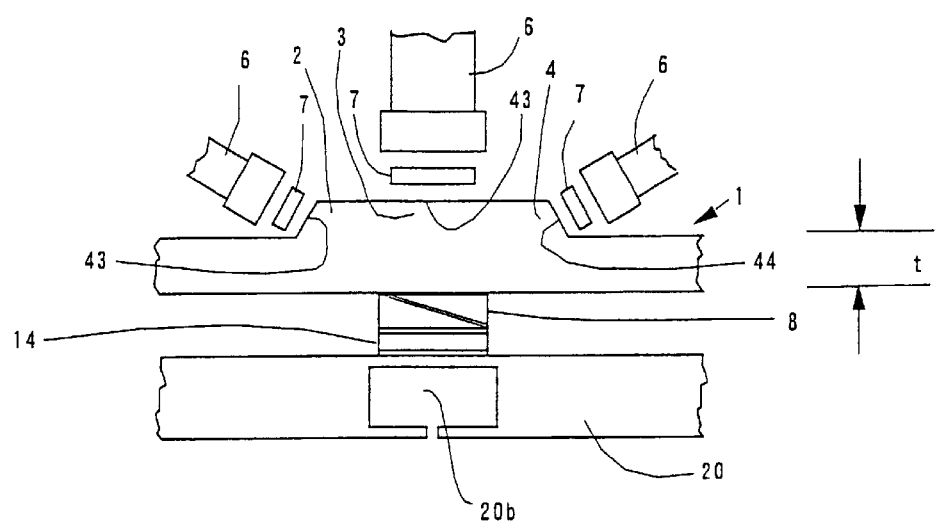
FIG. 2 is an explanatory view schematically showing another embodiment of an optical switch of the present invention.

Moreover, in the optical switch shown in FIGS. 1(*a*), (*b*), (*c*) and FIG. 2, since loss due to light divergence at the light transmission channels 2, 4, 5(3) is reduced by shortening an optical path length, it is preferable to reduce the thickness indicated as t in the figures. Specifically, the thickness is preferably 1 mm or less, or more preferably 0.5 mm or less.

Furthermore, the directions of the light transmission channels 2, 4, 5 are properly determined by relations with refractive indexes between the light wave guiding body, constituting the light transmission channels 2, 4, 5, and the open air (generally air), and by relations with reflection angles at the light reflection member 10 described later.

Figure 4:
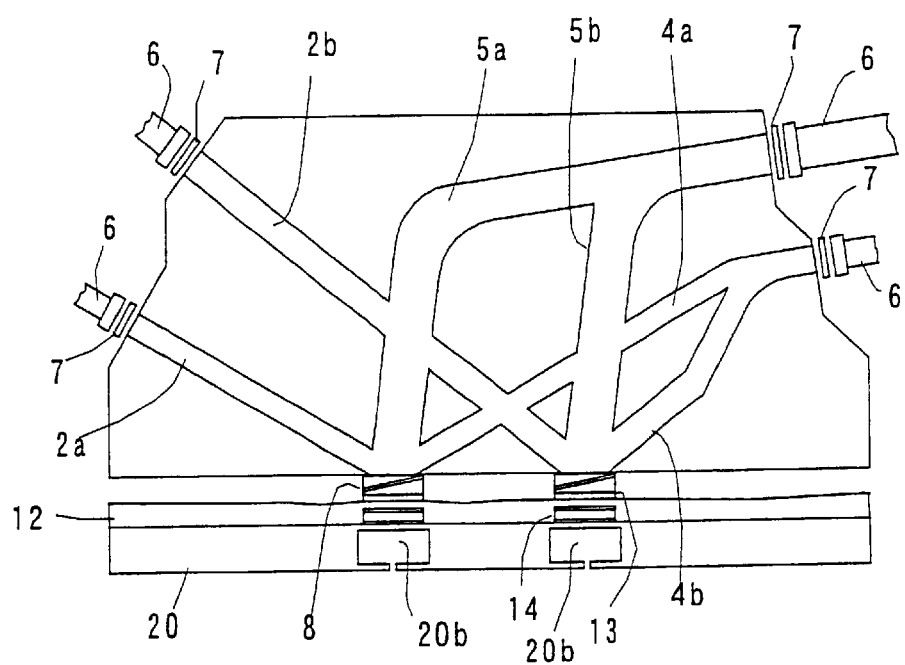
FIG. 4 is an explanatory view schematically showing another embodiment of an optical switch of the present invention.

However, the light transmission channels 2, 4, 5 may extend into directions that are appropriate only in these relations. For example, as shown in FIG. 4, in the optical switch having the light transmission channels 2*a*, 2*b*, 4*a*, 4*b*, 5*a*, 5*b* composed of an optical waveguide, the light transmission channels can be extended without being paralleled as an input-side light transmission channel 2*a* and another input-side light transmission channel 2*b*. The directions where the transmission channels extend may be changed halfway within a range where light totally reflects in the optical waveguide to form each of the light transmission channels 2*a*, 2*b*, 4*a*, 4*b*, 5*a*, 5*b* by combining straight optical waveguides and non-straight optical waveguides.

In such an optical switch, the degree of freedom in the shapes of the light transmission channels 2*a*, 2*b*, 4*a*, 4*b*, 5*a*, 5*b* is high, and smaller optical switches may be realized.

The optical wave guiding body, constituting the light transmission channels 2, 4, 5, in the present invention has refractive indexes to trap introduced light internally and then transmit the light. The body may be composed of a material having a single refractive index. However, the body is preferably composed of two or more layers having different refractive indexes since light divergence toward laminated layers may be restrained.

Moreover, as shown in FIG. 3, it is particularly preferable that each light transmission channel 2, 4, 5 is formed of an optical waveguide. This is so because the light transmission channels 2, 4, 5 may be easily prepared to have complex shapes and, the optical waveguide may be easily joined to each other. In addition to the characteristics of the layered optical wave guiding body, light divergence inside the layers is also restrained, so that light may be transmitted with an extremely small loss.

In the present specification, "optical waveguides" indicate the ones that are composed of a translucent material having a distribution of different refractive indexes and perform light transmission by trapping light internally.

The optical wave guiding body is, for instance, the one made of: glass, quartz, translucent plastic, translucent ceramics, or the like; a laminated body made of multiple layers having different refractive indexes; and substrates provided with a coating layer of a translucent material on a surface, or the like. The refractive indexes of the components of the waveguiding body are preferably within the range from 1.3 to 1.8, more preferably from 1.4 to 1.7.

Particularly, as the optical waveguide, there is exemplified the one having a substrate consisting of glass such as quartz glass and alkali borosilicate glass, insulator crystal such as lithium niobate and yttrium iron garnet, compound semiconductor such as gallium arsenide and indium phosphide, plastic (polymer) such as polymethylmethaacrylate (PMMA) and polyimide, or the like. The substrate is formed with a film thereon including a material having a refractive index changed by doping an impurity and so forth to the common system of the material used as the substrate. Also, the substrate can include a layer or portion having a different refractive index formed by directly diffusing an impurity and so forth in the aforementioned substrate.

The methods of forming a film on a substrate include, for instance, sputtering method, vacuum deposition methods such as molecular beam epitaxy (MBE), chemical vapor deposition (CVD), liquid phase epitaxy (LPE), vapor phase epitaxy (VPE), thermal polymerization used to form a plastic layer, and so forth. As a method for diffusing impurities or the like, there may be employed impurity ion implantation, impurity ion diffusion, or the like. Moreover, in forming multiple layers, these methods may be repeated. The number of layers may be appropriately selected based on desired objectives. Additionally, in case of an optical waveguide, the film or layer formed by the above-noted means has to be patterned to provide predetermined light transmission channels 2, 4, 5. The patterning may be performed by, for instance, removing unnecessary portions in photolithography or the like, or by preliminary setting a masking material on the above-noted substrate and then forming a film or diffusing an impurity to provide predetermined light transmission channels 2, 4, 5.

2. Optical Path-changing Portion

As shown in FIGS. 1(a), (b), and (c), the optical path-changing portion 8 of the present invention is provided in proximity to the light reflecting plane 1a of the light transmission portion 1 in a movable condition. The portion has a light introduction member 9 made of a translucent material, and a light reflection member 10 for totally reflecting light.

By this, the optical path of the light 21 input to the light transmission channel 2, when the optical path-changing portion 8 is brought into contact with the light transmission portion 1, may be optionally taken out of the light transmission channel 2 and into the light introduction member 9. Light 21 is then and reflected on the light reflection member 10 to switch the light 21 to an optical path which is different from the optical path where the light 21 is reflected at the light reflecting plane 1a of the light transmission portion 1 and is transmitted to one light transmission channel 4.

Moreover, since light may be switched by mechanical operations such as contact or off-contact from the light transmission portion 1 by displacement of the actuator portion 11 as mentioned later, a compact and highly-integrated multichannel optical switch may be manufactured without problems such as crosstalk. Furthermore, since the moving distance of the optical path-changing portion 8 for switching is only in the order of light wavelength, high-speed switching may be performed and an optical path itself does not have to be moved, thus reducing power consumption.

Herein, the meaning of being in "proximity to" the light transmission portion 1 is defined to mean: the optical path-changing portion 8 is arranged from the light reflecting plane 1a of the light transmission portion 1 at a distance longer than a wavelength of input light 21 when the actuator portion 11 is in a non-operable or operable state; and the optical path-changing portion is arranged from the light transmission portion 1 at a distance shorter than a wavelength of input light 21 when the actuator portion 11 is in the reverse condition thereto.

Figure 5:
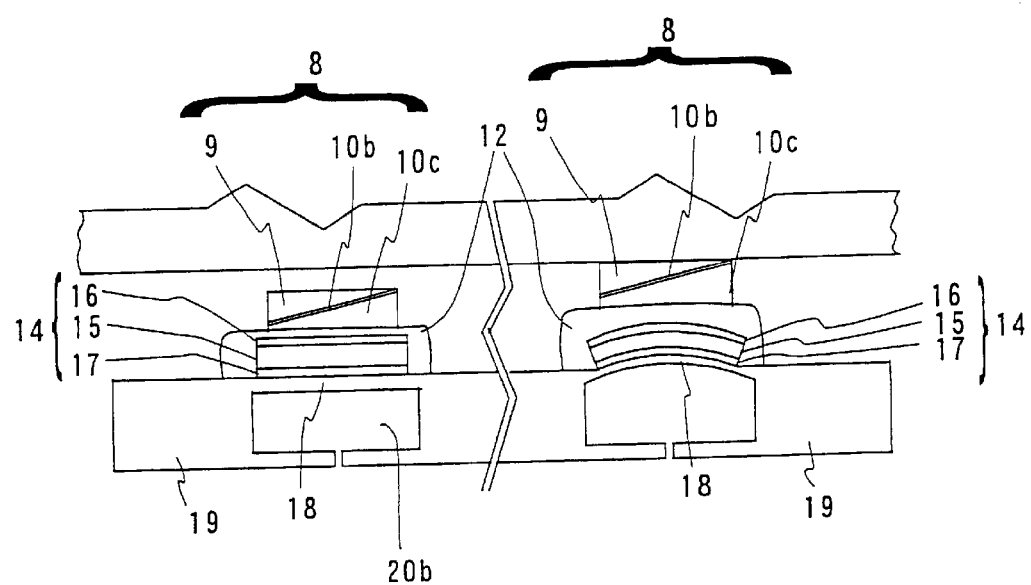
FIG. 5 is an explanatory view schematically showing another embodiment of an optical switch of the present invention.

For instance, as shown in FIG. 1(a), when the actuator portion 11 is at an operable state, the optical path-changing portion 8 may be arranged from the light reflecting plane 1a of the light transmission portion 1 at a distance longer than a wavelength of input light 21. As shown in FIG. 1(b), when the actuator 11 is in a non-operable state, the optical path-changing portion 8 may be arranged from the light reflecting plane 1a of the light transmission portion 1 at a distance that is the same as a wavelength of input light 21 or shorter. On the contrary, as shown in FIG. 5, the optical path-changing portion 8 may be arranged from the light transmission portion 1 at a distance that is the same as a wavelength of input light 21 or shorter when the actuator portion 11 is in an operable state. When the actuator portion 11 is in a non-operable state, the optical path-changing portion 8 may be arranged from the light transmission portion 1 at a distance longer than a wavelength of input light 21. These differences are based on the structure of a piezoelectric/electrostrictive element, and the driving methods thereof.

A material of the light introduction member 9 is preferably a translucent material, which has a smaller difference in refractive indexes with the light transmission portion 1 than the difference in refractive indexes between the light transmission portion 1 and the open air (generally air). This makes it possible to take out the light from the light transmission portion 1 and return the light to the light transmission channels 4, 5 of the light transmission portion 1 when the optical path-changing portion 8 is in contact with the light transmission portion 1. A translucent material having roughly the same light refractive index as the light transmission portion 1 is more preferable. A material to give such quality may include, for instance, glass, quartz, translucent plastic, translucent resin, translucent ceramics, and so forth.

However, in the present invention, the light introduction member may also be entirely or partially composed of translucent liquid by providing the translucent liquid between the light reflection member 10 or the light introduction member 9 and the light transmission portion 1. In this case, the translucent liquid effectively fills up a gap between the light reflection member 10 or the light introduction member 9 and the light transmission portion 1, so that optical paths may be easily altered.

As a translucent liquid includes there may be employed, for instance, organic solvents of low vapor pressure, oil, and so forth. A translucent liquid may be selected in consideration of a difference in refractive index between the liquid and the light transmission portion 1 and between the liquid and the light introduction member 9.

As a method of holding fluid translucent liquid on the optical path-changing portion, for example, a conventional art in which a wall in an appropriate height is provided at an upper outer periphery of the optical path-changing portion 8, and so forth may be adapted. However, a method is preferable in which the light introduction member 9 is formed with recessed and protruded parts or porous parts, and translucent solution is held in a capillary phenomenon by impregnating translucent solution thereto. In addition, when volatile translucent liquid is used as a translucent liquid, it is preferable to adapt a configuration in which the optical path-changing portion 8 is sealed airtight with the light transmission portion 1 to avoid vaporization.

On the other hand, in the light introduction member 9 of the present invention, the area where the light introduction member 9 is in contact with the light reflecting plane 1a of the light transmission portion 1 determines the amount of light taken out to the light reflection member 10. Thus, a surface 9a of the light introduction member facing the light transmission portion 1 is preferably made wider by including a whole plane where the light 21 input in the light transmission channel 2 projects.

It is preferable that the surface 9a facing the light reflecting plane 1a of the light transmission portion 1 is flat so as to secure the surface for a contact area with the light transmission portion 1. Specifically, the flatness is preferably 1 μm or less, more preferably 0.5 μm or less, and further preferably 0.1 μm or less. The flatness of the surface 9a facing the light reflecting plane 1a of the light transmission portion 1 is important in order to reduce a gap under the condition where the light introduction member 9 is in contact with the light reflecting plane 1a of the light transmission portion 1. The flatness is not necessarily limited to the one mentioned above as long as the contact part deforms in the contacting state. However, it is preferable that the flatness is small enough in comparison with a displacement of the actuator portion 11.

On the other hand, the flatness of the surface 9a of the light introduction member 9 is preferably 0.005 μm or more, and more preferably 0.015 μm or more so that separation may be securely performed when the light introduction member 9 in contact with the light reflecting plane 1a of the light transmission portion 1 is separated.

Incidentally, "flatness" described here includes both surface roughness and undulation.

Moreover, the thickness of the light introduction member 9 is preferably less than 50 μm, more preferably less than 20 μm, so as to reduce the loss of light.

Subsequently, the light reflection member 10 will be described. The light reflection member 10 constituting the optical path-changing portion 8 in the present invention, as described above, totally reflects the light that is taken out to the light introduction portion 9.

Figure 9:
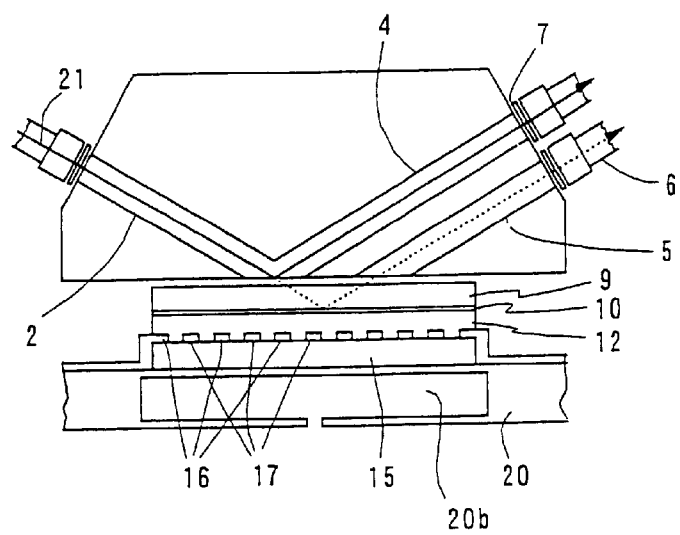
FIG. 9 is an explanatory view schematically showing another embodiment of an optical switch of the present invention.

Reflection angles at the light reflection member 10 may be appropriately determined based on the configuration of switches in accordance with the purposes. In addition to the reflection member to reflect light provided with an inclined surface having predetermined angle as shown in FIGS. 1(a), (b), and (c), the reflection member may include, for example, a plate reflection member 10 arranged in a flat condition at an angle of 0° as shown in FIG. 9. Incidentally, the optical path shown by a broken line in FIG. 9 shows an optical path when the optical path-changing portion 9 is brought into contact with the light transmission portion 8.

Also, reflection angles of the light reflection member 10 may be the angles, as shown in FIGS. 1(a), (b), and (c), to switch an optical path of light 21 that is input to one light transmission channel 2 and is transmitted to the light transmission channel 4 on an output side, to an optical path of light that is reflected at the light reflection member 10 of the optical path-changing portion 8 and is transmitted to the light transmission channel 5 on another output side. The reflection angles of the light reflection member 10 may be the reflection angles, as shown in FIG. 2, to switch an optical path of light (not illustrated) that is input to the light transmission channel 2 on an input side and is transmitted to the light transmission channel 4 on an output side, to an optical path of light 21 that is input to the light transmission channel 3 on another input side and is transmitted to the light transmission channel 4 on the same output side.

The light reflection member 10 in the present invention includes, for instance, a plate reflector made of a light reflecting material that is arranged with a predetermined inclination, a reflector such as a trigonal prism and a rectangular parallelepiped made of a light reflecting material that is arranged with a predetermined inclination, and so forth. The light reflection member may also include an electrode 16 having a light reflecting surface as described later and having functions as the light reflection member as shown in FIG. 7. Furthermore, as shown in FIG. 5, the light reflection member 10 may have a substrate 10c of a trigonal prism, rectangular parallelepiped and so forth formed with a light reflecting film 10b. The reflection member 10 as shown in FIG. 6 may be the one having the light reflecting film 10b itself that is formed integrally on the light introduction member 9 of a trigonal prism, a rectangular parallelepiped or the like at the side of a displacement transmission member 12, and so forth.

Among them, since reflection angles of a light reflection member may be accurately set, it is preferable to include the light reflection member 10 having the substrate 10c of a, trigonal prism, rectangular parallelepiped or the like formed with the light reflecting film 10b, as shown in FIG. 5. Alternatively, a reflector such as a trigonal prism and a rectangular parallelepiped made of a light reflecting material that is arranged with a predetermined inclination is preferable.

Figure 6:
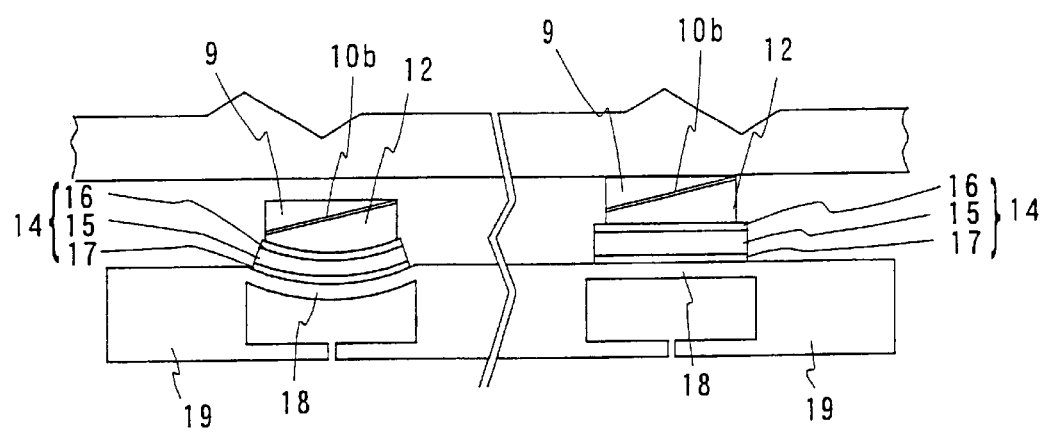
FIG. 6 is an explanatory view schematically showing another embodiment of an optical switch of the present invention.
Figure 7:
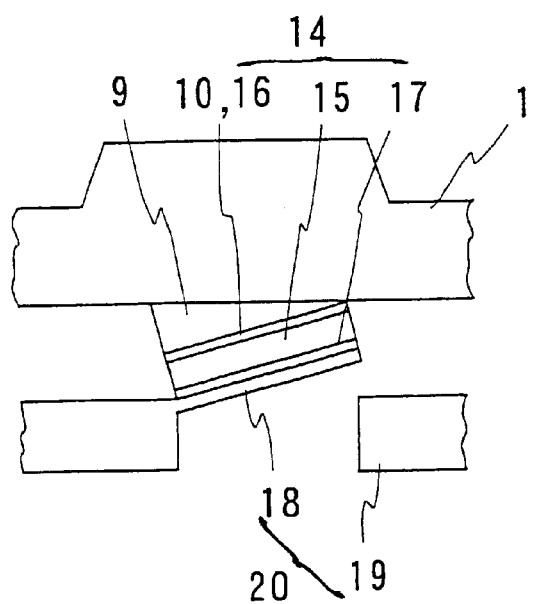
FIG. 7 is a partially enlarged view schematically showing another embodiment of an optical switch of the present invention.

Also, it is preferable that the light reflecting film 10b is formed integrally on the light introduction member 9 of a trigonal prism, a rectangular parallelepiped or the like at the side of the displacement transmission member 12 as shown in FIG. 6. The displacement transmission member 12 may be made of an elastic material from the point that the number of components can be reduced, manufacturing costs can be lowered, and contact precision between the optical path-changing portion 8 and the light transmission portion 1 can be improved.

The light reflecting film 10*b* is formed on the light introduction member 9 on the side of the displacement transmission member 12 in the optical switch shown in FIG. 6. This is because precision of reflection angles cannot be maintained because of the characteristics of the displacement transmission member 12 if the film is formed on the displacement transmission member 12. Accordingly, it is preferable that the light introduction member 9 has a hardness so as not to change the angle of a light reflection member by the operation of the actuator portion 11 in such an optical switch.

Materials having high reflective efficiency of light are preferable for the light reflection member 10. The materials include, for instance, single metal, alloy, glass, ceramics, rubber, organic resin and so forth by itself or the combination of two or more kinds thereof. The single metal and the components of the alloy include aluminum, titanium, chromium, iron, cobalt, nickel, silver, copper, tin, tantalum, tungsten, iridium, platinum, lead, and so forth.

When two or more kinds of these materials are used in combination, the light reflection member 10 may contain two or more kinds of the materials uniformly, but may also be a layered member, each of the layers consisting of a material different from that of the others. Additionally, the light reflection member 10, as a whole, may consist of the above materials. As shown in FIG. 6, the member may be one formed with the light reflecting film 10*b* on the surface.

As method of forming the light reflecting film 10*b*, there may be employed, for instance, thin film forming methods such as a vacuum deposition method, a sputtering method, a plating method, an ion plating method, an ion beam method, or a CVD method.

3. Actuator Portion

The actuator portion 11 in the present invention has functions of displacing with external signals and of transmitting the displacement to the above-noted optical path-changing portion 8, thus allowing the switching by mechanical operations, such as contacting or separating (off-contacting) the actuator portion from the light transmission portion.

The actuator portion 11 may be, for instance, one that generates displacement by an elastic body such as a plate spring. However, in view of excellent controllability and high-speed responsiveness, the actuator portion is preferably one that has a displacement transmission portion 12, a piezoelectric/electrostrictive element 14, a vibrating member 18 and a fixing member 19, depending on the desired use of the actuator portion. This type of the actuator portion 11 will be explained in detail below for each component.

(1) Displacement Transmission Member

The displacement transmission member 12 in the present invention is arranged between the optical path-changing portion 8 and the piezoelectric/electrostrictive element 14. The member is arranged in order to transmit displacement of the piezoelectric/electrostrictive element 14 to the optical path-changing portion 8 and to set a contact area between the optical path-changing portion 8 and the light transmission portion 1 at a predetermined size. In particular, a type of piezoelectric/electrostrictive element 14 generating bending displacement shown in FIGS. 1(*a*), (*b*), (*c*), FIG. 5, or the like, is extremely effective in averaging the amount of displacement distributed within the piezoelectric/electrostrictive element 14 and contacting or separating a whole surface of the optical path-changing portion 8 evenly from the light transmission portion 1.

The displacement transmission member 12 preferably has a configuration where the member may be in contact with both optical path-changing portion 8 and the piezoelectric/electrostrictive element 14 in a large area to allow effective transmission of displacement of the piezoelectric/electrostrictive element 14 to the optical path-changing portion 8.

A material of the displacement transmission member 12 preferably has a hardness to allow direct transmission of displacement of the piezoelectric/electrostrictive element 14 to the optical path-changing portion 8. As materials having such quality, there may be employed, for instance, rubber, organic resin, organic adhesive film, glass, and so forth. Among these, organic resin made of an epoxy-based, acrylic-based, silicone-based, polyolefine-based or the like organic material, or organic adhesive films are preferable. Organic resin or organic adhesive films in which curing and shrinkage are restrained by mixing a filler into these organic materials, are more preferable.

The displacement transmission member 12 is arranged by laminating the displacement transmission member 12 onto the piezoelectric/electrostrictive element 14. The method for lamination may be, for instance, a method of lamination with an adhesive, a method of coating the above-noted material of the displacement transmission member as solution, paste or slurry onto the piezoelectric/electrostrictive element 14, a method of bonding an organic adhesive film by heating, and so forth. Since an adhesive is unnecessary, the method of bonding an organic adhesive film by heating is preferable. In addition, in order to effectively utilize displacement of the piezoelectric/electrostrictive element 14, it is preferable to cut the layer of the displacement transmission member 12 into about the same shape as the piezoelectric/electrostrictive element 14 or to provide a notch.

Figure 8:
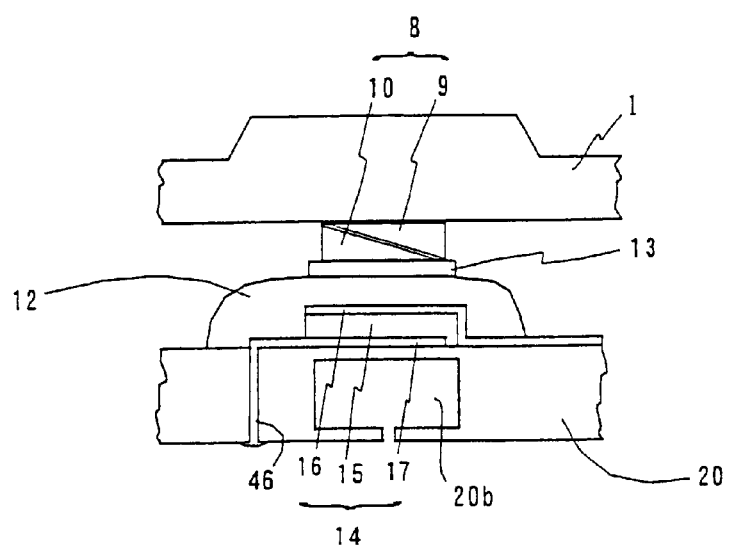
FIG. 8 is a partially enlarged view schematically showing another embodiment of an optical switch of the present invention.

Regarding the displacement transmission member 12 in the present invention, in consideration of maintaining the reflection angle of the light reflection member 10 at a predetermined one, it is preferable to arrange a plate member 13 on the displacement transmission member 12, as shown in FIG. 8.

As a material of the plate member 13, in order to maintain flatness of the plate member 13, a material in which ceramic powder such as zirconia, titania, lead oxide or the mixture thereof is dispersed in epoxy-based, acrylic-based, silicone-based or the like organic resin, is preferable. In this case, it is preferable to have ceramic powder at 0.1 to 10.0 weight parts relative to 1 weight part of organic resin.

On the other hand, the displacement transmission member 12 is not necessarily required. As shown in FIG. 7, displacement of the piezoelectric/electrostrictive element 14 may be directly transmitted to the light introduction member 9 without providing the displacement transmission member between the piezoelectric/electrostrictive element 14 and the optical path-changing portion 8.

(2) Piezoelectric/Electrostrictive Element

The piezoelectric/electrostrictive element 14 in the present invention has a piezoelectric/electrostrictive layer 15, and at least one pair of electrodes 16, 17 arranged on at least one part of the piezoelectric/electrostrictive layer 15. Here, "piezoelectric/electrostrictive" means piezoelectric and/or electrostrictive.

The piezoelectric/electrostrictive element 14 generates displacement by the application of voltage to the electrodes 16, 17. An element that achieves displacement in the thickness direction of the piezoelectric/electrostrictive layer 15, is preferable in the point that displacement of the piezoelectric/electrostrictive element 14 may be transmitted as is, as displacement or vibrations in the direction of the light transmission portion 1, to an optical path-changing portion 8.

The piezoelectric/electrostrictive element 14 may have a structure of having one piezoelectric/electrostrictive layer 15, or a structure of having multi-layered piezoelectric/electrostrictive layers 15 of two or three layers. When the structure has a multi-layered piezoelectric/electrostrictive layers 15, it is generally enough to dispose a pair of electrodes 16, 17 in every piezoelectric/electrostrictive layer 15. Alternatively, the piezoelectric/electrostrictive element 14 may have a so-called laminated (stacked) piezoelectric/electrostrictive element, where each piezoelectric/electrostrictive layer 15 and each electrode 16, 17 are laminated alternately.

As a material of the piezoelectric/electrostrictive layer 15, piezoelectric ceramics are preferable. However, the material may be electrostrictive ceramics, ferroelectric ceramics or antiferroelectric ceramics, and so forth. The material may either require polarization or not. Also, the material is not limited to ceramics, and may be a piezoelectric material consisting of polymer such as PVDF (polyvinylidene fluoride) and so forth, or a complex of the polymer and ceramics.

Ceramics for use in the piezoelectric/electrostrictive layer 15 may include, for instance, one of lead zirconate, lead magnesium niobate, lead nickel niobate, lead zinc niobate, lead manganese niobate, lead antimony stannate, lead titanate, barium titanate, lead magnesium tungstate, lead cobalt niobate and so forth, or two or more thereof. These ceramics are preferably a main component at 50 wt. % or more in the ceramic components constituting a piezoelectric/electrostrictive layer. Among them, ceramics containing lead zirconate are preferable as a main component.

Moreover, to the ceramics, one or more oxides of lanthanum, calcium, strontium, molybdenum, tungsten, barium, niobium, zinc, nickel, manganese, and so forth may be included for use. Among them, ceramics are preferable that contain a component consisting of lead magnesium niobate, lead zirconate and lead titanate as a main component, and at least one of lanthanum and strontium.

Incidentally, in the case of using antiferroelectric ceramics as a material for the piezoelectric/electrostrictive layer 15, preferable ceramics are: ceramics that have lead zirconate as a main component; ceramics that have a component consisting of lead zirconate and lead stannate as a main component; ceramics that have lead zirconate as a main component, and to which lanthanum oxide is added; and ceramics that have lead zirconate and lead stannate as main components, and to which lead zirconate or lead niobate is added.

The thickness of the piezoelectric/electrostrictive layer 15 is preferably 5 to 100 μm, more preferably 5 to 50 μm, and further preferably 5 to 30 μm. Moreover, the piezoelectric/electrostrictive layer 15 may be either dense or porous. When the layer is porous, the porosity is preferably less than 40%.

The electrodes 16, 17 may include, as shown in FIGS. 1(*a*), (*b*), (*c*), FIG. 8 and so forth, the first electrode 16 formed on at least one part of a surface of the piezoelectric/electrostrictive layer 15 on the side of the optical path-changing portion 8, and the second electrode 17 formed at least one part of a surface of the piezoelectric/electrostrictive layer 15 on the side of the substrate 20 as mentioned above. The first and second electrodes 16, 17 can be formed in a comb shape on either or both surfaces of the piezoelectric/electrostrictive layer 15 on the side of the optical path-changing portion 8 or the substrate 20 as shown in FIG. 9 (FIG. 9 showing an optical switch formed on a surface on the side of the optical path-changing portion 8), and so forth.

As a material for the electrodes 16, 17, a conductive metal that is generally solid at room temperature is employed. It is preferable to employ, for example, a single metal or alloy of two or more kinds selected from aluminum, titanium, chromium, iron, cobalt, nickel, copper, zinc, niobium, molybdenum, ruthenium, palladium, rhodium, silver, tin, tantalum, tungsten, iridium, platinum, gold, lead and so forth, or a combination of two or more systems thereof.

Also, the material may be cermet containing these materials, and aluminum oxide, zirconium oxide, silicon oxide, glass, or a piezoelectric/electrostrictive material.

Upon selection of these materials, it is preferable to select a material for the first electrode 16 and the second electrode 17, depending on a method of manufacturing the piezoelectric/electrostrictive element 14, described later.

For example, for an electrode formed before heat treatment of the piezoelectric/electrostrictive layer 15, a material containing a platinum group metal such as platinum, rhodium and palladium is preferable among the materials since the metal has resistance under a high-temperature oxide atmosphere during the heat treatment of the piezoelectric/electrostrictive layer 15. An electrode material is more preferable that has a platinum group metal such as platinum, rhodium and palladium, or an alloy containing the platinum group metal such as silver-platinum, platinum-palladium and platinum-silver-palladium as a main component. On the other hand, for an electrode after heat treatment of the piezoelectric/electrostrictive layer 15, there may be used a metal having low melting point, such as aluminum, gold, or silver.

In case of the piezoelectric/electrostrictive element 14 in which the first electrode 16 and the second electrode 17 are formed on a surface of the piezoelectric/electrostrictive layer 15 on the side of the optical path-changing portion 8 or the substrate 20 as shown in FIG. 9, it is preferable to form both the first electrode 16 and the second electrode 17 from the same material.

Also, the electrodes 16, 17 may have an appropriate thickness, depending on the purposes, but preferably 0.1 to 50 μm in thickness.

A method of forming the piezoelectric/electrostrictive element 14 on the vibrating member 18 may include: (1) a method of forming a precursor of the piezoelectric/electrostrictive layer 15 by a press molding method with a mold or a tape forming method with slurry materials and so forth, preliminarily forming the electrodes 16, 17 on the precursor of the piezoelectric/electrostrictive layer 15 by a film forming method, thermo-compression bonding the precursor of the piezoelectric/electrostrictive layer 15 and the electrodes 16, 17 to the vibrating member 18, and co-firing the precursor of the piezoelectric/electrostrictive layer 15, the electrodes 16, 17 and the vibrating member 18; (2) a method of forming a precursor of the piezoelectric/electrostrictive layer 15 by a press molding method with a mold or a tape forming method with slurry materials and so forth, preliminarily forming the electrodes 16, 17 on the precursor of the piezoelectric/electrostrictive layer 15 by a film forming method, firing the precursor of the piezoelectric/electrostrictive layer 15 and the electrodes 16, 17 to prepare a sintered piezoelectric/electrostrictive element 14, and bonding the sintered piezoelectric/electrostrictive element 14 to the substrate 20 that has the vibrating member 18 and the fixing member 19 integrally by firing; and (3) a method of forming the second electrode 17, the piezoelectric/electrostrictive layer 15 and the first electrode 16 sequentially on the sintered vibrating member 18 by a film forming method, and then firing all the layers 17, 15, and 16 simultaneously or firing each of the layers 17, 15, and 16 each time; and so forth. Among these methods, the method (3) is preferable.

As a film forming method, there may be employed, for example, thick film methods such as screen printing, dipping, electrophoresis, spraying or coating; or thin film methods such as ion beam, sputtering, vacuum deposition, ion plating, chemical vapor deposition (CVD) and plating; and so forth. Among them, thick film methods such as screen printing are preferable.

The thick film methods such as screen printing have several advantages, which include being able to simultaneously form leads to electrodes and terminal pads and the piezoelectric/electrostrictive layer 15 may be formed by using a paste or a slurry having ceramic particles as a main component, so that preferable piezoelectric characteristics may be obtained. Also, the piezoelectric/electrostrictive element 14 and the vibrating member 18 may be joined integrally without using an adhesive, so that the methods are highly reliable and reproducible and, furthermore, they may be easily integrated.

Moreover, in case of forming patterns in a desirable shape by a film forming method, predetermined patterns may be formed by screen printing, photolithography, and so forth. Patterns may be formed by removing unnecessary parts by machining such as laser beam machining, slicing and ultrasonic machining. However, in accordance with industrial viewpoints, screen printing is preferable. Additionally, the electrodes 16, 17 may be formed by a method of forming electrodes through a through-hole 46 as shown in FIG. 8.

Firing temperature of the films may be properly determined, depending on the materials thereof, but the temperature is generally 500 to 1400° C. Particularly, for the piezoelectric/electrostrictive layer 15, 1000 to 1400° C. is preferable. Additionally, it is preferable to fire the piezoelectric/electrostrictive layer 15 in the presence of a source of vaporization which controls vapor pressure of components constituting the piezoelectric/electrostrictive layer.

Moreover, any shape may be adapted for the piezoelectric/electrostrictive layer 15, the first electrode 16 and the second electrode 17, depending on the purposes. The shapes may include, for instance, polygons such as a triangle and square, curves such as a circle, ellipse and ring, comb shapes, grid shapes, or the combination thereof.

The piezoelectric/electrostrictive layer 15, the first electrode 16, and the second electrode 17 formed on the substrate 20 may be formed integrally with the substrate 20 treating each of the layers 17, 15, and 16 with heat every time after formation of each of the layers 17, 15, and 16 as described above. Alternatively, after forming all the layers 17, 15, and 16, these layers 17, 15, and 16 may be simultaneously treated with heat to integrate them with the substrate 20. Additionally, in case of forming the first electrode 16 and the second electrode 17 by a thin film method, heat treatment is not always necessary to integrate these electrodes.

Subsequently, as a modification of the piezoelectric/electrostrictive element 14 of the present invention, a so-called laminated (stacked) piezoelectric/electrostrictive element will be explained.

Figure 10A:
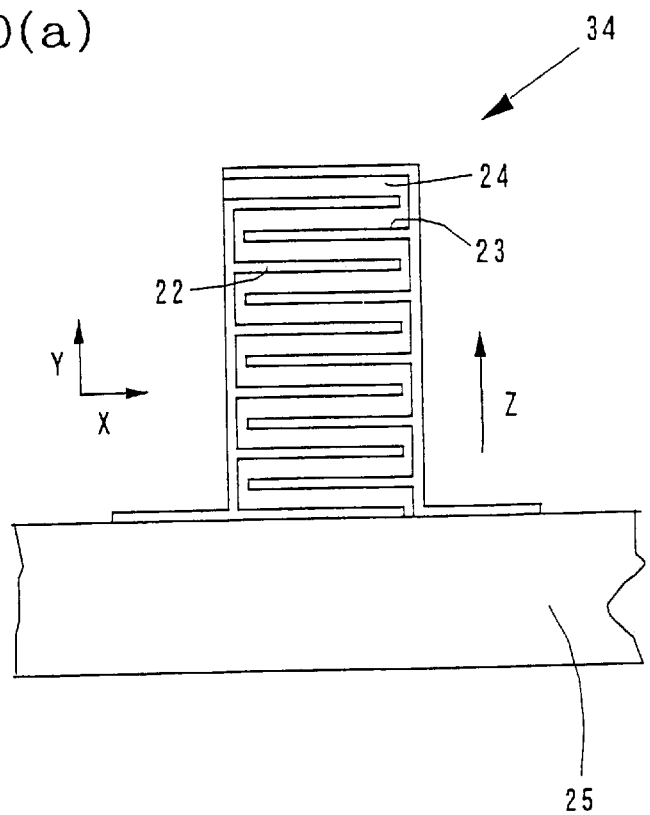
FIGS. 10(a) and (b) are cross-sectional views schematically showing a modification of an actuator member in an actuator portion constituting an optical switch of the present invention.

As shown in FIG. 10, this piezoelectric/electrostrictive element 34 is a laminate, which includes an anode layer 22 in which a plurality of layers functioning as anodes are linked, and a cathode layer 23 in which a plurality of layers functioning as cathodes are linked, are both alternately laminated with the piezoelectric/electrostrictive layer 24 therebetween.

The piezoelectric/electrostrictive element 34 can utilize displacement in the Y direction, which is a direction of lamination, and in the X direction, which is a direction parpendicular to the direction of lamination. However, a shown in FIG. 10(a), in case of utilizing displacement in the Y direction of a laminate direction, it is preferable to make the piezoelectric/electrostrictive element 34 longer in the Y direction, than in the X direction. This is because, when direction Z of displacement is the Y direction, which is a direction of lamination, the amount of displacement is a total of the displacements in a thickness direction of each piezoelectric/electrostrictive layer.

Figure 10B:
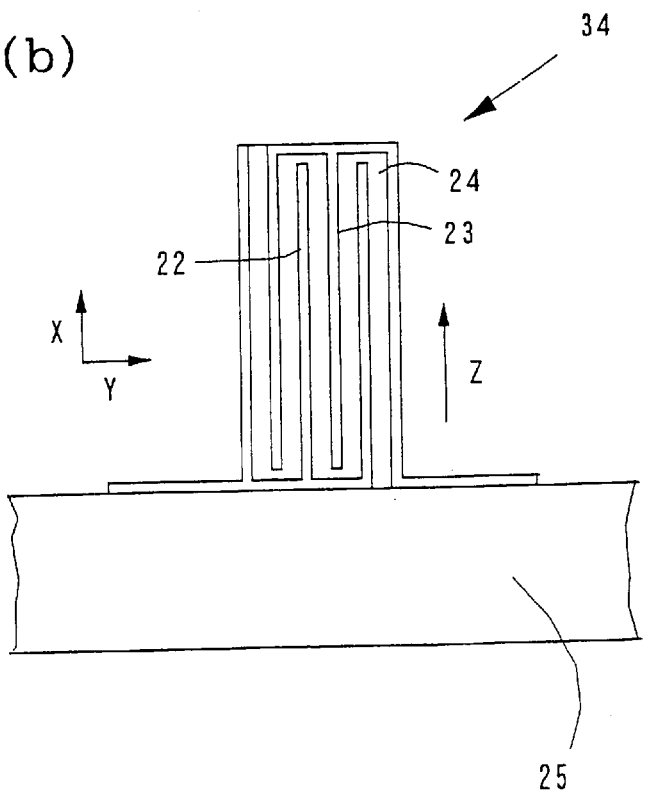
FIG. 10(b) shows an embodiment of a piezoelectric/electrostrictive element using a displacement in the X direction, which is a direction perpendicular to a direction of lamination.

On the other hand, in utilizing displacement in the X direction, which is a direction perpendicular to the direction of lamination, as shown in FIG. 10(b), the piezoelectric/electrostrictive element 34 is preferably longer in the X direction, than in the Y direction. The amount of displacement becomes a displacement in proportion with the length of each piezoelectric layer 21 in the X direction.

As a method for producing such a laminated piezoelectric/electrostrictive element 34, there may be employed the following method.

Figure 11:
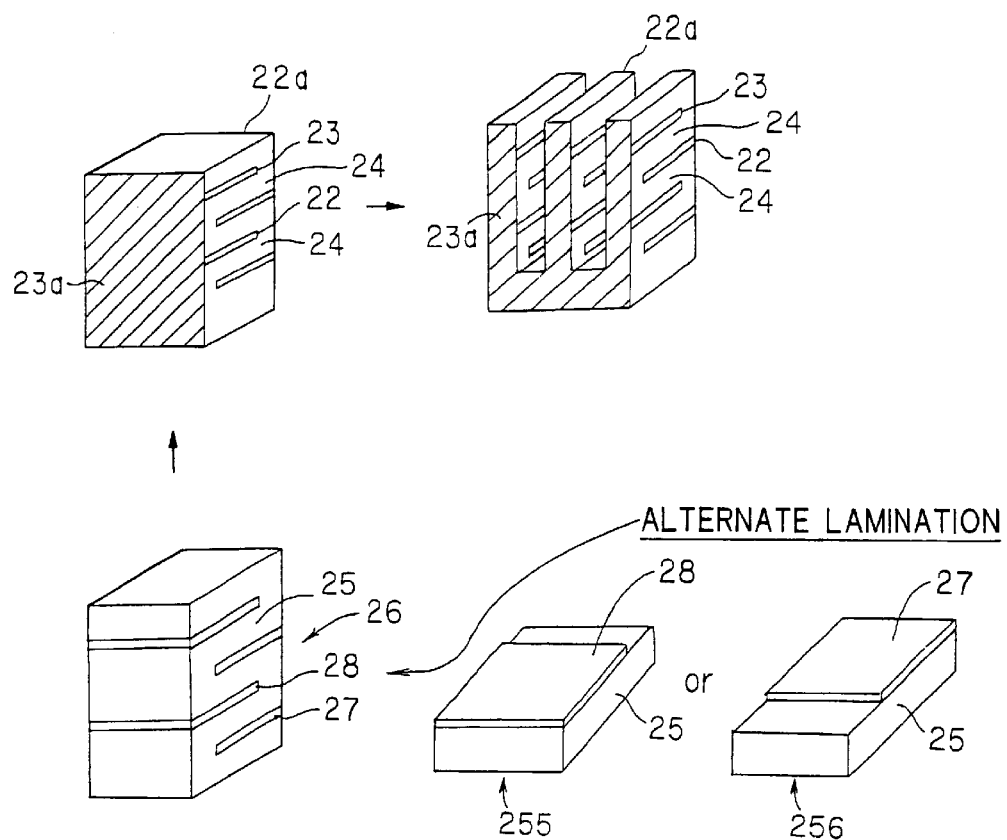
FIG. 11 is an explanatory view schematically showing an embodiment of a method for producing a laminated piezoelectric/electrostrictive element.

As shown in FIG. 11, a precursor 25 of a piezoelectric/electrostrictive layer is formed by the press molding method or tape forming method with slurry materials and so forth mentioned above. On the obtained precursor 25, precursors 27 and 28 of electrode layers each having predetermined pattern are formed by a film-forming method such as screen printing to obtain complex precursors 255 and 256.

Next, these complex precursors 255 and 256 are subjected to alternate lamination and compression bonding to obtain a laminated body 26 having a predetermined number of each of the layers. Then, the laminated body 26 is fired.

Then, the fired laminated body 26 is cut to expose each of the electrode layers 22 and 23 to one of the two surfaces which are in parallel with the direction of lamination and faces each other.

Then, each of joint layers 22a and 23a is formed on each of the surface where each of the electrode layers 22 and 23 are exposed by the aforementioned film-forming method such as screen printing. The joint layers 22a and 23a are fired and each of the electrode layers 22, which functions as an anode, is joined with other electrode layers 22, and each of the electrode layers 23, which functions as a cathode, is joined with other electrode layers 23 to obtain a laminated piezoelectric/electrostrictive element 34.

The thus obtained laminated piezoelectric/electrostrictive element 34 is preferably cut in a direction of lamination so that portions to serve as a common fixing member 19 are left at regular intervals. By this a plurality of laminated piezoelectric/electrostrictive elements 34 can easily be produced on the same fixing member 19. In such a laminated piezoelectric/electrostrictive element 34, the fixing member 19 can be commonly used, and the vibrating member 18 is not always necessary. Therefore, reducing the number of switch parts can be accomplished in some applications.

Incidentally, in the case of forming a plurality of laminated piezoelectric/electrostrictive elements 34 by such a method, it is preferable that at least one of the joint layers 22a and 23a is preferably formed with being separated in each element.

In such a laminated piezoelectric/electrostrictive element 34, the laminated body 26 may be formed by screen printing in addition to press molding methods, tape forming methods, or the like.

It is preferable that the electrode layers 22 and 23 constituting a part of the piezoelectric/electrostrictive element 34 are formed from metal having, in particular, resistance in an oxidizing atmosphere at high temperatures in the case that the electrode layers are subjected to a heat treatment simultaneously with or at about the same temperature as that for firing of the piezoelectric/electrostrictive layer 24. The cutting process where these electrode layers 22 and 23 are exposed may performed to the laminated body 26 before being fired.

Further, the joint layers 22a and 23a formed after firing the laminated body 26 may be formed with a material different from that of the electrode layers 22 and 23. The method for producing the laminated piezoelectric/electrostrictive element 34 is similar to that of a general piezoelectric/electrostrictive element except for the aforementioned matters, and description for such matters is omitted here.

(3) Vibrating Member, Fixing Member

The vibrating member 18 in the present invention is in contact with at least one part of the piezoelectric/electrostrictive element 14 to support piezoelectric/electrostrictive element 14, and converts strain of a piezoelectric/electrostrictive layer into bending displacement or vibrations.

The vibrating member 18 is preferably in a plate shape since this is a shape that is likely to vibrate into the direction of the light transmission portion 1. In this case, the thickness of the vibrating member 18 is preferably the same dimension as the thickness of the piezoelectric/electrostrictive layer 15 described above. Thus, the vibrating member 18 is likely to follow sintering shrinkage of the piezoelectric/electrostrictive layer 15, so that stress at an interface between the piezoelectric/electrostrictive layer 15 or the electrode layers 16, 17 and the vibrating member 18 decreases and the layer and the member may be easily integrated.

Specifically, the member is preferably in the thickness of 1 to 100 $\mu$m, more preferably in the thickness of 3 to 50 $\mu$m, and further preferably in the thickness of 5 to 20 $\mu$m. Also, a ratio of thickness in comparison with the piezoelectric/electrostrictive layer 15 (vibrating member: piezoelectric/electrostrictive layer) is preferably 1:0.5 to 1:10, and more preferably 1:1 to 1:5.

It is preferable that the vibrating member 18 directly supports the piezoelectric/electrostrictive element 14 without a material such as an organic adhesive in consideration of degeneration with the passage of time, heat resistance and weather resistance.

Also, it is preferable that a material of the vibrating member 18 is highly heat resistant in order to prevent the vibrating member 18 from degenerating during forming the piezoelectric/electrostrictive layer 15 or the like. Moreover, the vibrating member 18 preferably consists of an electric insulating material to maintain an electrical separation of the electrodes 16, 17 and so forth when the electrodes 16, 17 of the piezoelectric/electrostrictive element 14 directly supported thereby, and leads and lead terminals that are connected thereto, etc. are formed on a surface of the vibrating member 18.

Specifically, the member consisting of a highly heat resistant metal or porcelain enamel or the like in which a surface of the metal is coated with ceramics such as glass, or the member consisting of ceramics or the like may be employed. Among them, the member consisting of ceramics is preferable.

Ceramics constituting the vibrating member 18 may include, for example, stabilized zirconium oxide, aluminum oxide, magnesium oxide, mullite, aluminum nitride, silicon nitride, glass, and so forth. Among these, stabilized zirconium oxide is preferable since it has high mechanical strength, toughness and little chemical reaction to a piezoelectric/electrostrictive layer and electrodes. Furthermore, stabilized zirconium oxide is preferable to be it contained aluminum oxide at 0.1 to 5 mole %.

The stabilized zirconium oxide includes stabilized zirconium oxide and partially stabilized zirconium oxide. The stabilized zirconium oxide is distinguished from zirconium oxide that often generates cracks during a phase change between monoclinic crystals and tetragonal crystals at around 1000° C., since it has a cubic crystal structure or the like and does not generate the phase change.

The stabilized zirconium oxide may include ones that contain a stabilizer such as calcium oxide, magnesium oxide, yttrium oxide, scandium oxide, ytterbium oxide, cerium oxide or rare earth metal oxides at 1 to 30 mole %. In order to improve the mechanical strength of a vibrating member, stabilized zirconium oxide containing yttrium oxide is preferable. In this case, yttrium oxide is preferably contained at 1.5 to 6 mole %, or more preferably 2 to 4 mole %.

Additionally, a crystal phase of ceramics constituting the vibrating member 18 may be a mixed phase of cubic crystals and monoclinic crystals, a mixed phase of tetragonal crystals and monoclinic crystals, a mixed phase of cubic crystals, tetragonal crystals and monoclinic crystals, and so forth. Among them, a tetragonal crystal phase, or a mixed phase of tetragonal crystals and cubic crystals is preferable in consideration of strength, toughness and durability.

When the vibrating member 18 is made of ceramics, the member is composed of a plurality of crystal grains. The average size of the crystal grains is preferably 0.05 to 2 $\mu$m, or more preferably 0.1 to 1 $\mu$m, to improve the mechanical strength of the vibrating member 18.

Subsequently, the fixing member 19 will be explained. The fixing member 19 in the present invention fixes at least one part of the vibrating member 18 so as to vibrate the vibrating member 18.

The fixing member 19 preferably consists of ceramics, but may be the same or different ceramics from the material of the vibrating member 18. There may be employed, for instance, ceramics such as stabilized zirconium oxide, aluminum oxide, magnesium oxide, titanium oxide, mullite, spinel, aluminum nitride, silicon nitride, glass, or the like. Among them, a ceramic material having zirconium oxide as a main component, a ceramic material having aluminum oxide as a main component, or a ceramic material having a mixture thereof is more preferable.

Although clay or the like is sometimes added as a firing (sintering) aid when the vibrating member 18 or the fixing member 19 is made of ceramics, it is preferable that a component that is likely to be vitrified, such as silicon oxide and boron oxide, is not contained in the ceramics excessively. An excessive amount of a component that is likely to be vitrified is advantageous in joining to the piezoelectric/electrostrictive element 14. However, it becomes difficult to maintain a composition of a predetermined piezoelectric/electrostrictive layer because of promotion of reaction between the vibrating member 18 upon being fired and a piezoelectric/electrostrictive layer, thus resulting in the decrease in element characteristics. Specifically, it is preferable to adjust a percentage content of a material that is likely to be vitrified, such as silicon oxide and boron oxide, in a substrate, at less than 3 wt. %, or more preferably less than 1 wt. %.

It is preferable that the vibrating member 18 and the fixing member 19 are integrated to constitute the substrate 20 consisting of ceramics. Furthermore, a recessed portion 20a shown in FIGS. 1(a), (b), (c) and the like or a hollow portion 20b shown in FIG. 2 and the like (hereinbelow sometimes referred to as recessed portion 20a and the like for convenience of explanation) is preferably formed with giving the vibrating member 18 a thin structure. However, it is not necessarily required to constitute the vibrating member 18 and the fixing member 19 integrally. The fixing member 19 made of a metal, for instance, stainless steel, iron and so forth, may fix the vibrating member 18 made of ceramics. In this case, there may be employed a method where a surface of the vibrating member 18 is metallized and the obtained metallized layer is joined to the fixing member 19 by brazing, or the like.

There is no particular limitation on a shape of the recessed portion 20a, or the like, formed in the substrate 20. The recessed portion may be, for instance, circular, elliptic, or polygonal such as square and rectangular, or the combination thereof. However, in case of a polygonal shape, the corners are preferably trimmed in a round ridge.

It is also preferable that the fixing member 19 is arranged to surround the periphery of the vibrating member 18. However, the member does not have to hold an entire periphery of the vibrating member 18. As shown in FIG. 7, the member may be arranged to hold at least one part of the vibrating member 18.

As a method of forming the substrate 20 by sintering the vibrating member 18 and the fixing member 19 for integration, a method of laminating layers such as a green sheet or a green tape by thermo compression bonding and subsequently sintering the layers, or the like, may be employed.

A method of forming the recessed portion 20a or the like with giving the vibrating member 18 a thin structure may be: a method of preliminarily providing a through-hole in a predetermined shape so as to form the recessed portion 20a or the like in a second layer before lamination in case of laminating, for instance, two green sheets or green tapes; and a method of providing the recessed portion 20a by machining such as grinding, laser machining, punching by press machining, etc., in a molded body obtained by pressure molding with a mold, casting, injection and so forth, or the like.

Moreover, in the optical switch of the present invention, it is preferable that the light transmission portion 1 and the substrate 20 are fixed with a distance between the light transmission portion 1 and the optical path-changing portion 8 by arranging a clearance forming member 45 on the substrate 20. In this case, as shown in FIG. 11, the clearance forming member 45 may be formed on an entire surface of the substrate 20, except for a region where the piezoelectric/electrostrictive element 14 is arranged. However, the member is preferably formed in patterns so as to equalize a distance between the light transmission portion 1 and the optical path-changing portion 8.

The optical switch in the present invention may contact or separate (off-contact) a single optical path-changing portion 8 from the light transmission portion 1 by displacement of a single actuator portion 11 described above, but the switch may contact or separate a single optical path-changing portion 8 from the light transmission portion 1 by displacement of a plurality of the actuators 11.

4. Multichannel Optical Switch

A multichannel optical switch in the present invention has an optical switch mentioned above, in other words, at least a light transmission portion, an optical path-changing portion and an actuator portion. The light transmission portion has a light reflecting plane that is provided on at least one part of a surface facing the optical path-changing portion and totally reflects light into the light transmission channels, consisting of an optical wave guiding body, in at least three directions with the reflecting plane as a starting point. The optical path-changing portion is provided in proximity to the light reflecting plane of the light transmission portion in a movable condition and has a light introduction member and that is made of a translucent material; and a light reflection member for totally reflecting light. The actuator portion has a mechanism to be displaced by external signals and to transmit the displacement to the optical path-changing portion. The multichannel optical switch has a plurality of the optical switches. The optical switches contact or separate (off-contact) the optical path-changing portion from the light reflecting plane of the light transmission portion by displacement of the actuator portion in accordance with external signals. The switches then convert an optical path where the light input to a light transmission channel is totally reflected at the light reflecting plane of the light transmission portion and is transmitted to a specific light transmission channel on an output side, to another optical path where the light input to a light transmission channel is taken out to the light introduction member, is totally reflected by the light reflection member, and is transmitted to a specific light transmission channel on the output side.

Each component of the multichannel optical switch in the present invention is the same as those already mentioned for the optical switches. Accordingly, the description of each component is omitted herein, and specific embodiments of multichanneling will be shown.

In the present specification, "multichannel" indicates that there are a plurality of locations where optical switching is performed by switching an optical path between a light reflecting plane of the aforementioned light transmission portion and a light reflection member of an optical path-changing portion. The so-called "multichannel optical switch" herein includes the ones in which each component is integrated and shared between optical switches.

Figure 12:
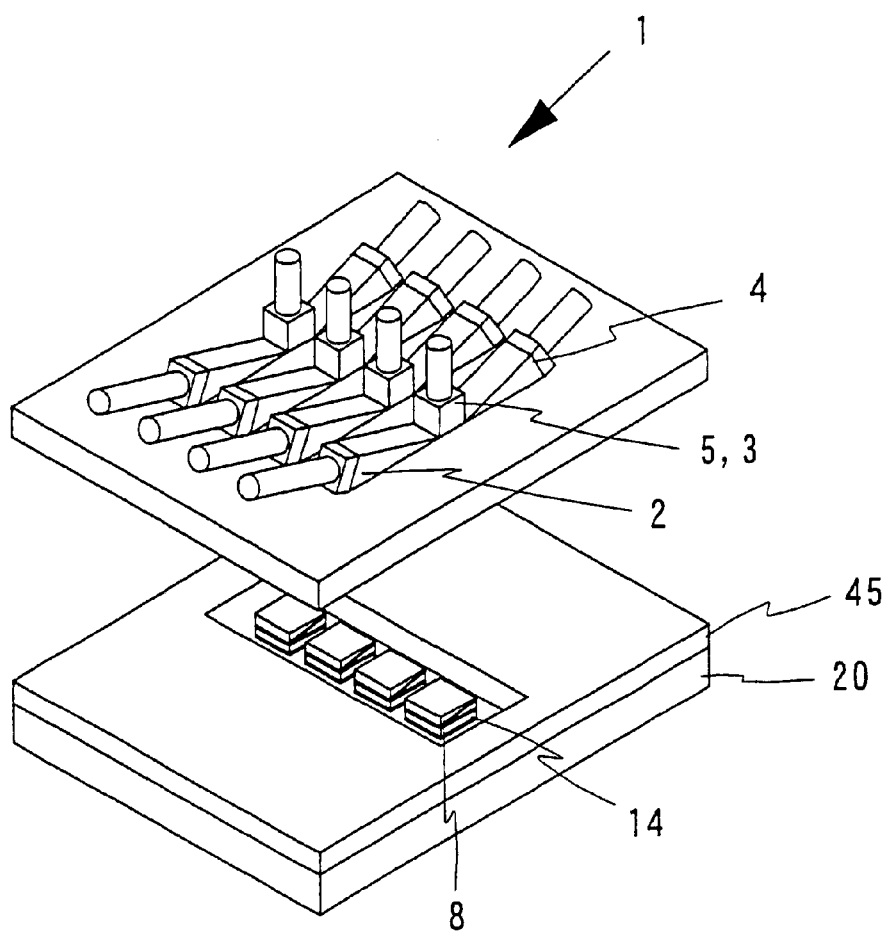
FIG. 12 is an explanatory view schematically showing one embodiment of a multichannel optical switch of the present invention.

One embodiment in the present invention may include a multichannel optical switch in which a plurality of optical switches shown in, for instance, FIGS. 1(a), (b), (c) to FIG. 3 are arranged in a row as in FIG. 12. The multichannel optical switch performs optical switching in which an optical path of the light input to one input-side light transmission channel 2 is optionally switched and the light is transmitted to two or more output-side light transmission channels 4, 5. Or, the multichannel optical switch performs optical switching in which an optical path of each light input to two or more input-side light transmission channels 2, 3 is optionally switched and the light is transmitted to one output-side light transmission channel 4. Such a multichannel optical switch has advantages in that the structure is simple and multichanneling is easy.

An input side and an output side are distinguished simply in relation to the travelling direction of light. Even in the same configuration, input and output are differently termed by reversing a travelling direction.

Figure 13:
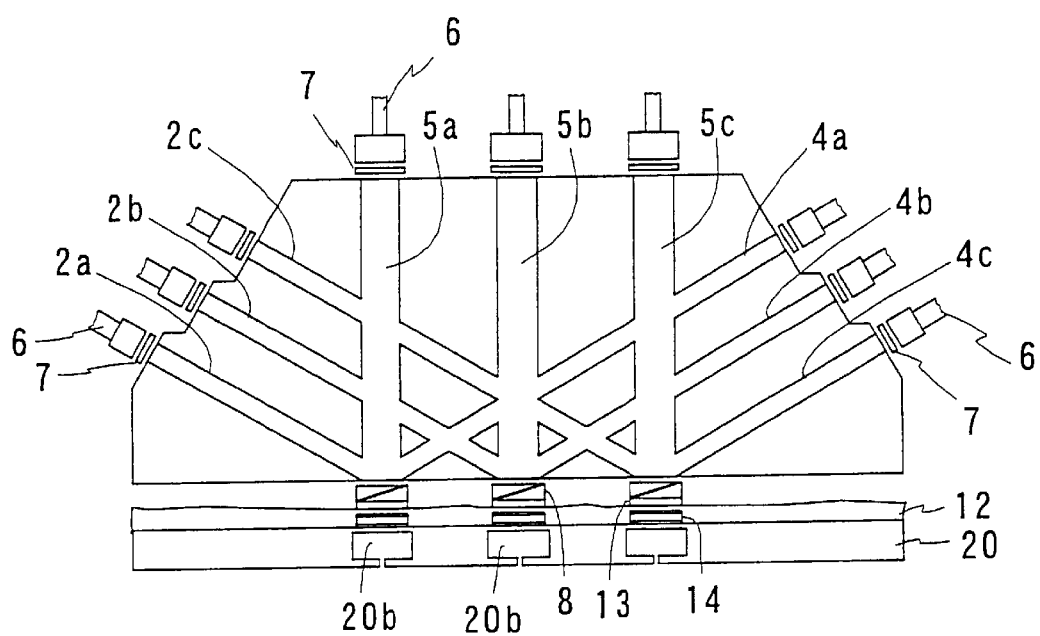
FIG. 13 is an explanatory view schematically showing another embodiment of a multichannel optical switch of the present invention.

Another embodiment in the present invention may include a multichannel optical switch formed with each light transmission channel 2a to 2c, 4a to 4c, 5a to 5c in a plurality of optical switches in a single light transmission portion 1 as shown in FIG. 13. It is preferable that each light transmission channel 2a to 2c, 4a to 4c, 5a to 5c, is formed at an optical waveguide since the light transmission channels 2a to 2c, 4a to 4c, 5a to 5c can be mutually arranged in proximity in such a multichannel optical switch. Also, each light transmission channel in a plurality of optical switches is mutually crossed so as to share a part of each light transmission channel 2a to 2c, 4a to 4c, 5a to 5c, thus greatly miniaturizing and integrating an optical switch.

Figure 14:
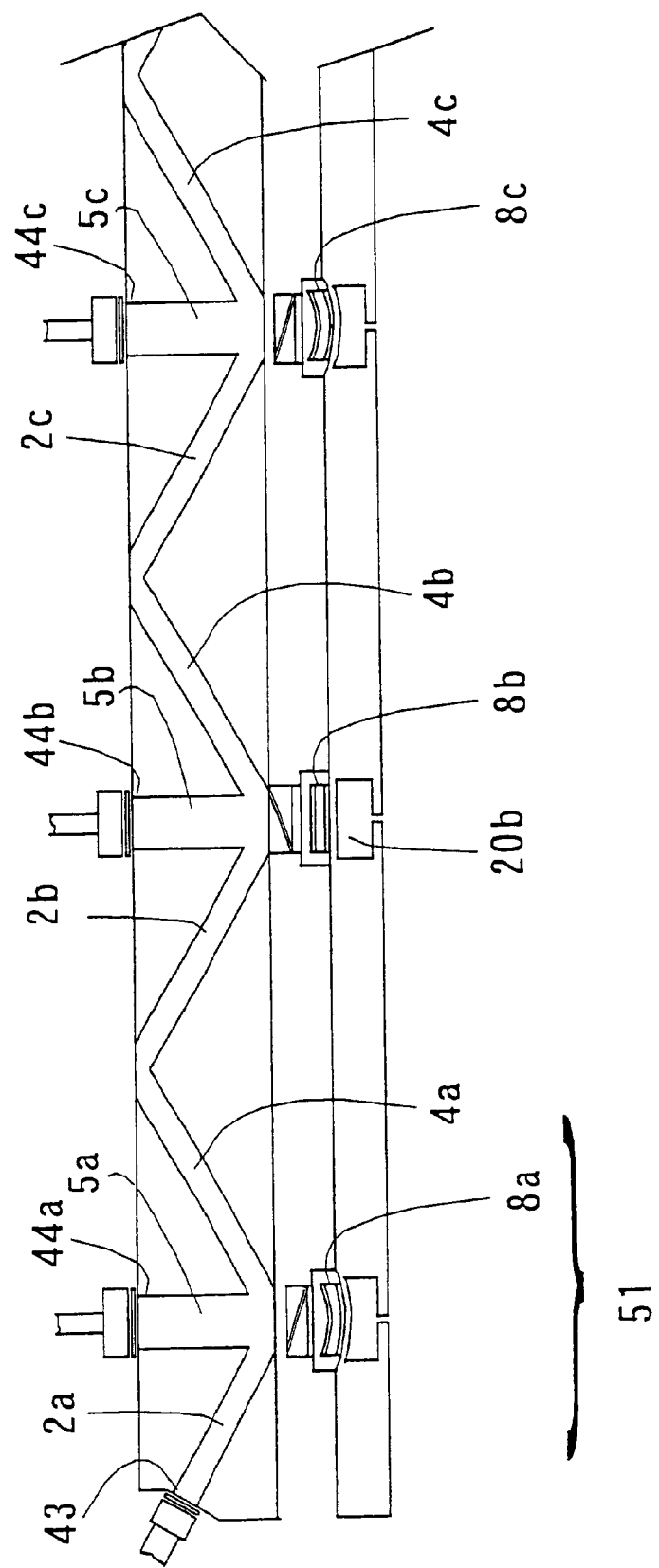
FIG. 14 is an explanatory view schematically showing another embodiment of a multichannel optical switch of the present invention.
Figure 15:
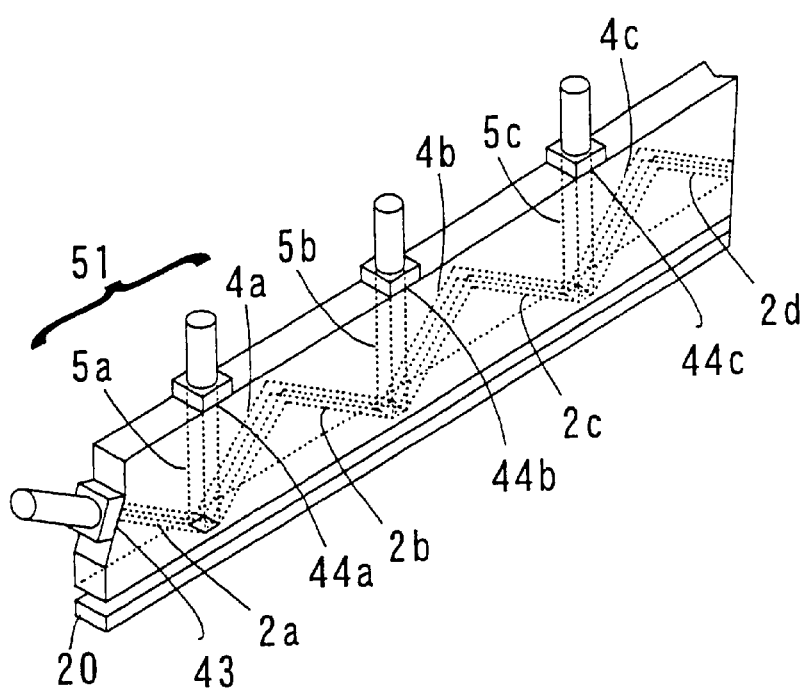
FIG. 15 is an explanatory view schematically showing another embodiment of a multichannel optical switch of the present invention.

Furthermore, as shown in FIG. 14, FIG. 15, another embodiment in the present invention may be a multichannel optical switch in which a plurality of optical switches 51 are constituted by a plurality of optical switches having one input channel 2a to 2c and a plurality of output channels 4a to 4c, 5a to 5c, and one output channel 4a, 4b, 4c is linked with an input channel 2a, 2b, 2c respectively between adjacent optical switches 51 to perform switching of the light input from an input end portion of one optical switch in each optical path-changing portion of a plurality of optical switches including the optical switch.

The multichannel optical switch shown in FIG. 14 has an advantage in that signal loss is small in light transmission since light transmission channels 2a, 2b, 2c, 4a, 4b, 4c are composed of an optical waveguide. On the contrary, the multichannel optical switch shown in FIG. 15 has an advantage in that design is simple since the light transmission portion as a whole is composed of an optical wave guiding body of the same material (the optical waveguide is excluded) and, in an essential sense, specific light transmission channels 2a to 2c, 4a to 4c, 5a to 5c are formed.

In these multichannel optical switches, an optical path of the light input from an input end 43 is switched at each optical path-changing portion 8a, 8b, 8c (not shown in FIG. 15) of a plurality of optical switches. The light is emitted from an output end 44a, 44b, 44c and transmitted to an external signal channel.

Figure 16:
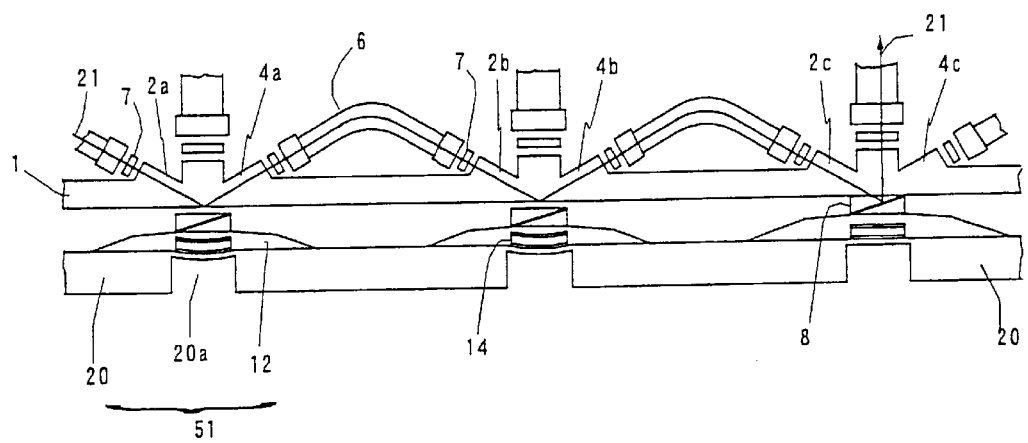
FIG. 16 is an explanatory view schematically showing another embodiment of a multichannel optical switch of the present invention.

Further, as shown in FIG. 16, another embodiment in the present invention may be a multichannel optical switch where a plurality of optical switches 51 join one output channel 4a, 4b with input channel 2b, 2c, respectively, between adjacent optical switches 51 by an optical fiber 6 to perform switching of light input from input end of at least one optical switch in an optical path-changing portion of a plurality of optical switches.

According to this multichannel optical switch, similarly to the multichannel optical switch shown in FIG. 15, since the light transmission portion as a whole can be composed of an optical wave guiding body of the same material (the optical waveguide is excluded), it is easily designed. In addition, since optical transmission is performed with an optical fiber, the multichannel optical switch is more advantageous in suppressing divergence of light in comparison to that shown in FIG. 15.

Incidentally, in this multichannel optical switch, it is preferable to unitarily form the light transmission portion 1 of each optical switch 51 in view of simplifying the design. However, the multichannel optical switch may be the one in which each optical transmission portion 1 of the optical switches 51 is independently formed.

Figure 17:
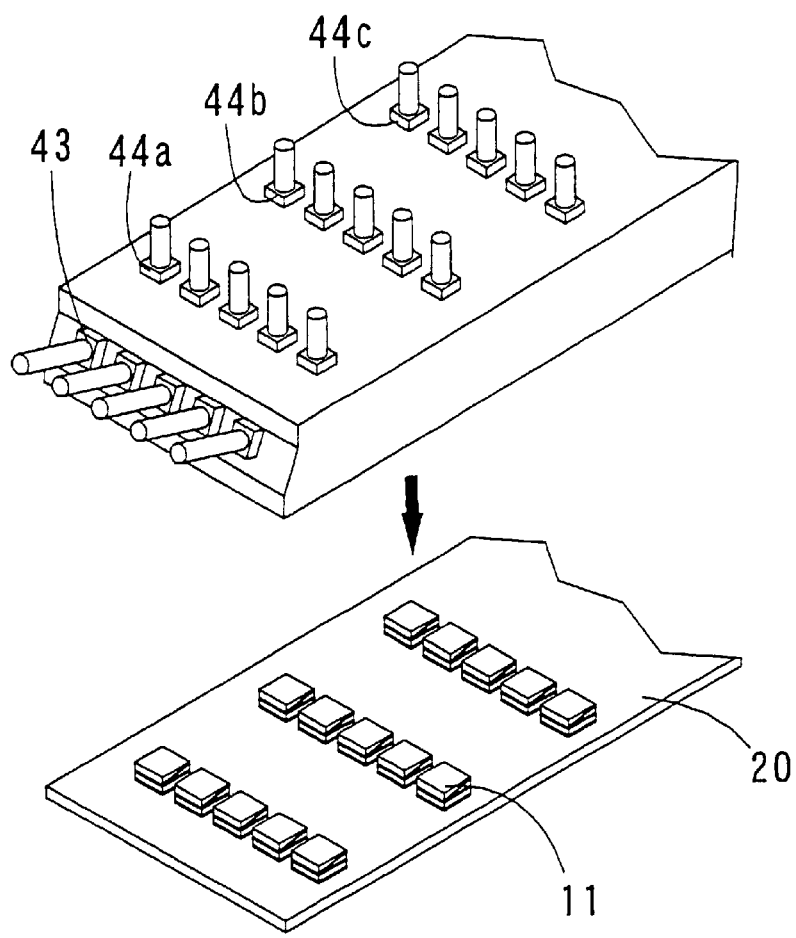
FIG. 17 is an explanatory view schematically showing another embodiment of a multichannel optical switch of the present invention.

Furthermore, another embodiment in the present invention may include a multichannel optical switch in which a plurality of the multichannel optical switches shown in FIGS. 14 to 16 described above are arranged in a row as shown in FIG. 17.

This multichannel optical switch has an advantage in that a large-scale multichanneled optical switch may be easily manufactured since a plurality of light-signal input ends and/or light-signal output ends may be easily provided, and the size is easily reduced since the configuration is simple.

Figure 18:
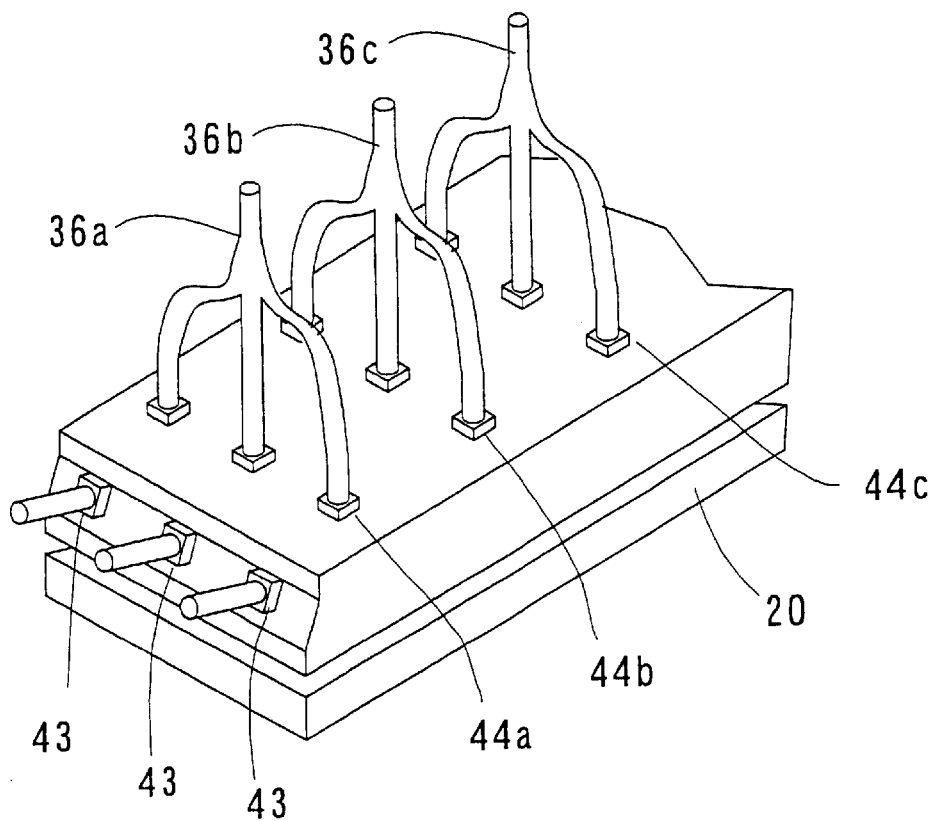
FIG. 18 is an explanatory view schematically showing another embodiment of a multichannel optical switch of the present invention.

Furthermore, another embodiment in the present invention may include, as shown in FIG. 18, a multichannel optical switch in which optical couplers 36a, 36b, 36c are joined to output ends 44a, 44b, 44c of each light transmission channel in the above-noted multichannel optical switch shown in FIGS. 14 to 16, and at least one part of light transmission channels (not illustrated) is collected. The multichannel optical switch has an advantage in that input and output signals are optionally selected and light is switched to an optional signal channel since output ends 44a, 44b, 44c may be shared.

In addition to the structure in which optical couplers 36a, 36b, 36c are joined to output ends 44a, 44b, 44c, or the like, a structure in which an optical divider is connected with the input end 43. By such a structure, an optical switch by which the same light signal branches off and is transmitted to any destination of output is obtained.

Further, in the present invention, a structure in which an optical divider is connected with the input end 43 may be employed. By such a structure, an optical switch by which a plurality of light signals having various wavelength demultiplexes, and each light signal is transmitted to any channel.

Figure 19:
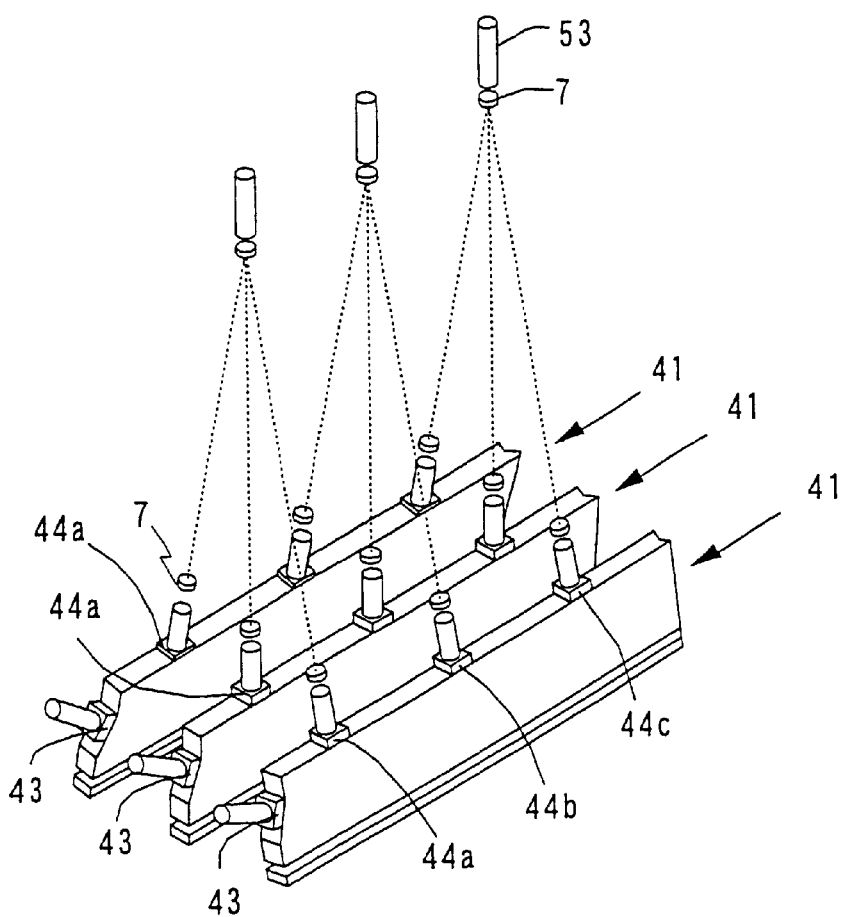
FIG. 19 is an explanatory view schematically showing another embodiment of a multichannel optical switch of the present invention.

Furthermore, another embodiment in the present invention may include, as shown in FIG. 19, a multichannel optical switch having a plurality of multichannel optical switches 41 shown in FIGS. 14–16. In the multichannel optical switch, each multichannel optical switch 41 is arranged so that each output end in each multichannel optical switch, for instance, at least one part of 44a, 44b, 44c is positioned in an arc with an input end of the external light transmission channel 53 disposed independently from the each multichannel optical switch 41 as a center.

This multichannel optical switch also can transmit light output from each output end of a plurality of multichannel optical switch to a common light transmission channel as the multichannel optical switch shown in FIG. 18 described above. However, this optical switch can be greatly reduced in size without generating or minimizing signal loss at joined parts since light transmission channels do not have to be joined by physical means.

In this multichannel optical switch, each multichannel optical switch 41 may be disposed in various position according to the purpose and use. For example, as shown in FIG. 19, each of output ends 44a, 44b, 44c disposed at the same position among each output end in each multichannel optical switch may be positioned in an arc with an input end of the external light transmission channel 53 in the center. For example, only one output end 44a in each out put end may be positioned in an arc with an input end of the external light transmission channel 53 in the center.

In this multichannel optical switch, as shown in FIG. 19, it is preferable to dispose a lens 7 in each of the output ends 44a, 44b, 44c to suppress divergence of light emitted from each of the output end 44a, 44b, 44c. Further, it is also preferable that the lens 7 is disposed in an input end of the external light transmission channel 53 depending on the external light transmission channel 53 to be employed.

Figure 20:
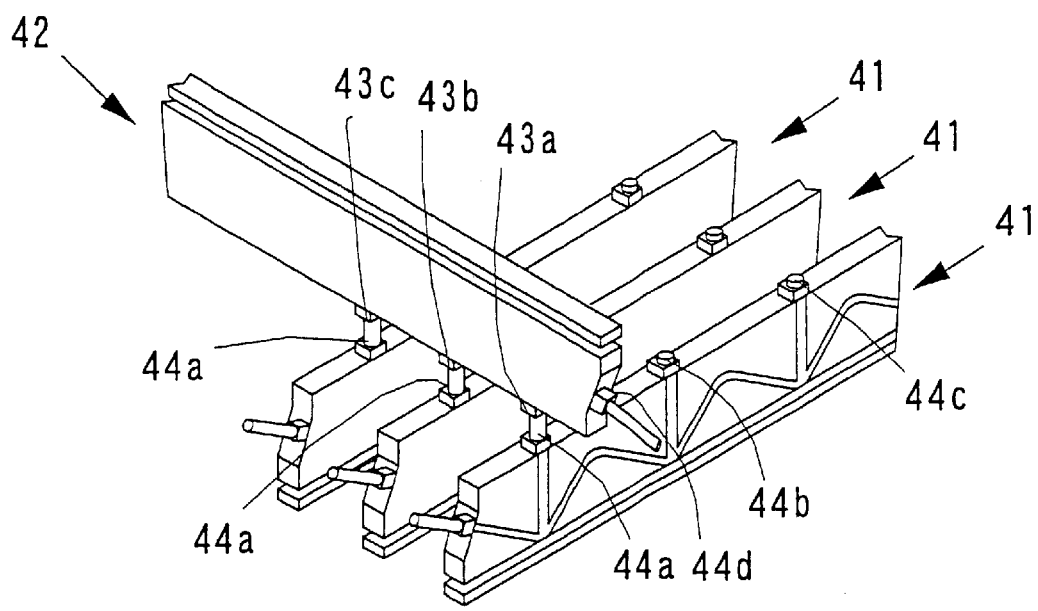
FIG. 20 is an explanatory view schematically showing another embodiment of a multichannel optical switch of the present invention.

Furthermore, another embodiment in the present invention may include, as shown in FIG. 20, a multichannel optical switch in which each output end 44 of a plurality of multichannel optical switches 41 shown in FIGS. 14–16 described above, and a plurality of input ends 43a, 43b, 43c in another identical multichannel optical switch 42 are linked.

Like the multichannel optical switches in FIGS. 18, 19 described above, this multichannel optical switch transmits the light output from each output ends of a plurality of various multichannel optical switch. However, since this optical switch constitutes optical transmission channel by directly connecting each optical-signal input end or optical-signal output end of each multichannel optical switch, the multichannel optical switch has such advantages in that the miniaturization is easy, and so forth.

Figure 21:
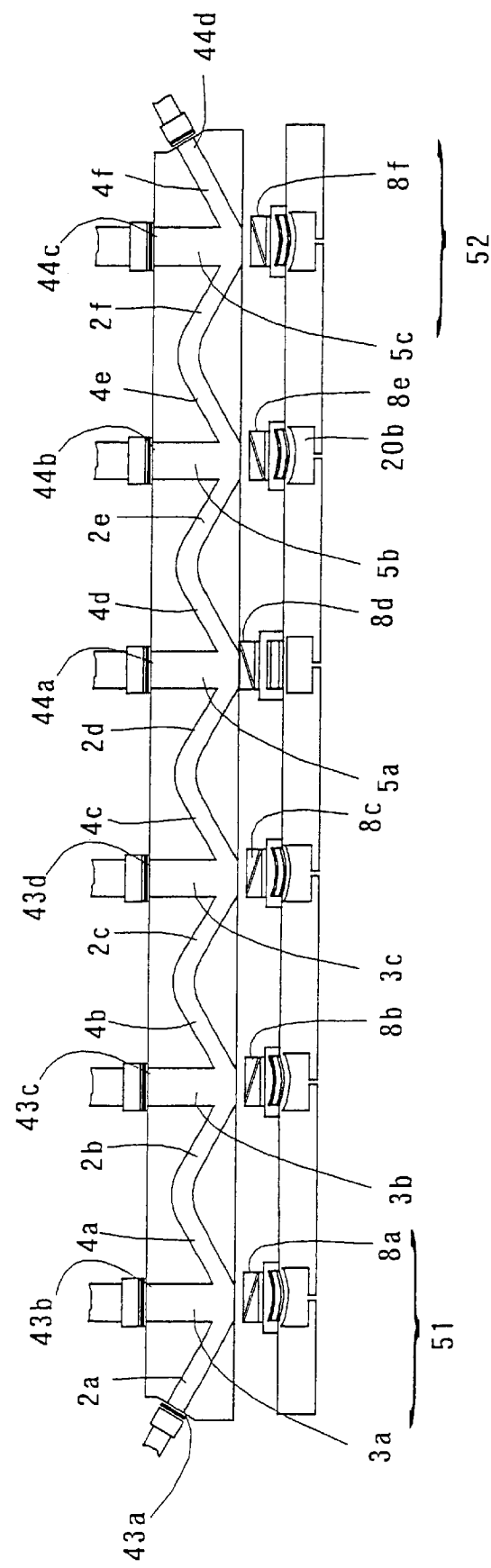
FIG. 21 is an explanatory view schematically showing another embodiment of a multichannel optical switch of the present invention.

Further, as another embodiment of the present invention, there may be employed a multichannel optical switch in which a plurality of optical switch 51 is structured by at least one optical switch 51 having a plurality of input-side channels 2a to 2c and 3a to 3c and at least one optical switch 52 having a plurality of output-side channels 4d to 4f and 5a to 5c as shown in FIG. 21, one output-side light transmission channel 4a to 4c is communicated with one input-side light transmission path 2b to 2f between adjacent optical switches 51, and light input from input end 43a to 43d of a plurality of optical switches 51 is switched in an optical path-changing portion 8a to 8f of a plurality of optical switches 51.

Furthermore, as shown in FIG. 21, in this multichannel optical switch, each of optical path-changing portions 8a to 8f has a light reflection member having at least two kinds of light reflection angles (In FIG. 21, the light reflection plane 8a to 8c and 8d to 8f among the light path-changing portions 8a to 8f is indicated, and light reflection angles which are mutually line-symmetrical (e.g., relation of 30° and 150° )) among the light path-changing portions 8a to 8f. For instance, the light that is input from the input terminal 43a proceeds to a light transmission channel to the optical path-changing portions 8d to 8f when the optical path-changing portions 8a, 8b, 8c are separated from the light transmission portion 1. In the optical path-changing portion 8d in contact with the light transmission portion 1, the optical path is switched to the light transmission channel 5a to the output end 44a, and the light is transmitted from the output end 44a to an external light transmission channel. On the other hand, for instance, in the condition that the optical path-changing portion 8a is brought into contact with the light transmission portion 1, an optical path of the light input from the input end 43b is switched to the light transmission channel 4a toward the optical path-changing portion 8b. The light is similarly transmitted to the light transmission path 5a to 5c toward any of the output ends 44a to 44d corresponding the optical path-changing portions 8d to 8f in any of the optical path-changing portions 8d to 8f which is brought in contact with the light transmission portion 1, and transmitted to the external light transmission channel from any of the output ends 44a to 44d.

Thus, since this multichannel optical switch achieves a M×N type optical switch in which each light input to a plurality of input ends 43a to 43d in one light transmission portion 1 is transmitted to arbitrary one of output ends of 44a to 44d by the operating condition of a plurality of optical path-changing portions, the multichannel optical switch has an advantage in that it is very profitable in trying miniturization and high integration. However, the multichannel optical switches shown in FIGS. 17 to 19 can input light signals from each input end 43 and process each light signal in parallel. On the other hand, in this multichannel optical switch, a slight time difference is required to input light signals to each light input end 43 (43a to 43d).

Though a multichannel optical switch of the present invention is explained with the intention of optical communication mainly, application for an optical printer is hereinbelow described as an applied embodiment.

Figure 22:
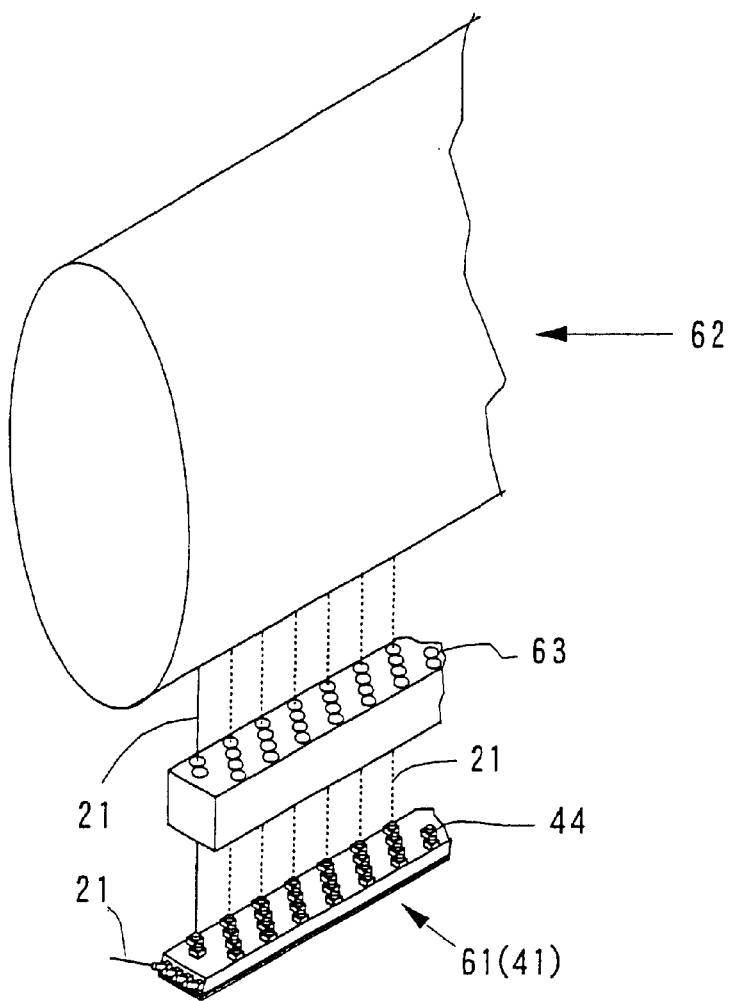
FIG. 22 is an explanatory view schematically showing another embodiment of a multichannel optical switch of the present invention.

FIG. 22 is an explanatory view schematically showing an embodiment where a multichannel optical switch of the present invention is applied to an optical printer.

As shown in FIG. 22, in this optical printer, the aforementioned multichannel optical switch 41 is adapted as a printer head 61. This optical printer is provided, as basic elements, with the printer head 61 consisting of the multichannel optical switch 41, a lens 63 collecting the light 21 output from each output end 44, and a photosensitive dram 62 forming a latent image by the light 21 collected by the lens 63.

In such an optical printer, a structure in which a laser light source is disposed in a shape of an allay substantially may be employed. Therefore, optical parts such as a polygon mirror and a lens annexed to the polygon mirror like a conventional laser printer may be omitted and thereby a sharp minimization and decrease in cost by reducing the number of parts can be planned.

In addition, this optical printer is not the one that forms a latent image by light output from each light source disposed at every desired dot like a LED printer, but the one that forms a latent image by light output from each output end being switched the light from the same light source at every output end disposed in accordance with every dot. Therefore, this optical printer does not have unevenness in quantity of light in each dot and does not cause a problem of decrease in quantity of light due to a temperature rise upon long-time use.

Further, this optical printer is made to be an optical printer having a desired resolution by suitably adjusting intervals for arranging each output end 44 of a multichannel optical switch 41 constituting the printer head 61.

The present invention was explained above in detail based on some embodiments, but the interpretation of the present invention should not be limited to the above-mentioned embodiments. Without departing from the scope of the invention, based on the knowledge of persons skilled in the art, variations, modifications, improvements, and so forth may be added. There may be further provided an optical switch which enables to switch every specific input light and is suitable for an optical communication system.

As described above, according to the present invention, an optical switch may be provided that solves conventional problems of optical switches, consumes little power and, at the same time, allows high-speed response, size reduction, high integration, and reduction of signal attenuation.

What is claimed is:

1. An optical switch comprising at least a light transmission portion, an optical path-changing portion and an actuator portion; wherein the light transmission portion has a light reflecting plane provided on at least one part of a plane facing the optical path-changing portion to totally reflect light, and light transmission channels having optical wave guiding bodies and being provided in at least three directions with the light reflecting plane as a starting point;

the optical path-changing portion is provided in proximity to the light reflecting plane of the light transmission portion in a movable condition and has a light introduction member made of a translucent material and a light reflection member for totally reflecting light; and the actuator portion has a mechanism that is displaced by external signals and transmits the displacement to the optical path-changing portion; and wherein the optical path-changing portion is contacted or separated from the light reflecting plane of the light transmission portion by displacement of the actuator portion in response to the external signals; and an optical path where light input to the light transmission channels is totally reflected at the light reflecting plane of the light transmission portion and is transmitted to a specific light transmission channel on an output side, is switched to another optical path where light input to the light transmission channel is transmitted to the light introduction member, and is totally reflected at the light reflection member and is transmitted to a specific light transmission channel on the output side.

2. The optical switch according to claim 1, wherein the actuator portion has:

a piezoelectric/electrostrictive element comprising a piezoelectric/electrostrictive layer and at least one pair of electrodes arranged on one part of the piezoelectric/electrostrictive layer;

a vibrating member that is in contact with at least one part of the piezoelectric/electrostrictive element to support the piezoelectric/electrostrictive element and that converts strain of the piezoelectric/electrostrictive layer into bending displacement or vibrations; and a fixing member to fix at least one part of the vibrating member so as to vibrate the vibrating member.

3. The optical switch according to claim 2, wherein a ceramic substrate is constituted by unitarily firing the vibrating member and the fixing member, and a recessed portion or a hollow portion is formed in the ceramic substrate giving the vibrating member a thin structure.

4. The optical switch according to claim 2, wherein the piezoelectric/electrostrictive element comprises a laminated body in which an anode layer having linking multiple layers functioning as anodes and a cathode layer having linking multiple layers functioning as cathodes are alternately laminated with a ceramic piezoelectric/electrostrictive layer being positioned therebetween.

5. The optical switch according to claim 1, wherein the light transmission portion comprises two or more layers having different light refractive indexes.

6. The optical switch according to claim 1, wherein the light transmission channels of the light transmission portion comprises an optical waveguide.

7. The optical switch according to claim 1, wherein the light transmission portion is configured by joining at least two optical wave guiding bodies to one optical wave guiding body so as to form light transmission channels into at least three directions, with the light reflecting plane of the light transmission portion as a starting point.

8. The optical switch according to claim 1, further comprising a condenser lens or a collimator lens arranged at each of a plurality of light-signal input ends and/or light-signal output ends of the light transmission portion, and light signals are input and output through the condenser lens or the collimator lens.

9. The optical switch according to claim 1, wherein the light reflection member is a light reflecting film that is integrally formed on a plane of the light introduction member on the side of the displacement transmission member.

10. A multichannel optical switch comprising a plurality of optical switches that has a light transmission portion, an optical path-changing portion and an actuator portion; wherein the light transmission portion comprises a light reflecting plane provided on at least one part of a plane facing the optical path-changing portion to totally reflect light, and light transmission channels having optical wave guiding bodies and being provided in at least three directions with the light reflecting plane as a starting point;

the optical path-changing portion is provided in proximity to the light reflecting plane of the light transmission portion in a movable condition and has a light introduction member made of a translucent material and a light reflection member for totally reflecting light; and the actuator portion has a mechanism that is displaced by external signals and transmits the displacement to the optical path-changing portion; and wherein the optical path-changing portion is contacted or separated from the light reflecting plane of the light transmission portion by displacement of the actuator portion in response to the external signals; and an optical path where light input to the light transmission channels is totally reflected at the light reflecting plane of the light transmission portion and is transmitted to a specific light transmission channel on an output side, is switched to another optical path where light input to the light transmission channel is transmitted to the light introduction member, and is totally reflected at the light reflection member and is transmitted to a specific light transmission channel on the output side.

11. The multichannel optical switch according to claim 10, wherein each light transmission channel in a plurality of optical switches is formed of a single light transmission portion.

12. The multichannel optical switch according to claim 11, wherein each light transmission channel in a plurality of optical switches crosses each other and shares a part of each light transmission channel.

13. The multichannel optical switch according to claim 10, wherein one input-side channel is linked to one output-side channel in series as for each optical switch; and light that is input from an input end of optical switches, is switched at each optical path-changing portion of a plurality of optical switches.

14. The multichannel optical switch according to claim 10, wherein a plurality of optical switches are constituted by at least one optical switch having a plurality of input-side channels and at least one optical switch having a plurality of output-side channels, and one input-side channel is linked to one output-side channel between adjacent optical switches, switching the light input from input ends of a plurality of optical switches at the optical path-changing portion of the plurality of optical switches.

15. A multichannel optical switch according to claim 10, wherein a plurality of optical switches link one input-side channel to one output-side channel between adjacent optical switches by means of an optical fiber, switching at least the light input from input ends in an optical switch at each optical path-changing portion of a plurality of optical switches.

16. A multichannel optical switch in which a plurality of the multichannel switches according to claim 13 are arranged in a row.

17. A multichannel optical switch comprising a plurality of the multichannel optical switches according to claim 13;

wherein each multichannel optical switch is arranged by locating at least one part of an output end of each light transmission channel in each multichannel optical switch in an arc condition with an input end in an outer light transmission channel, which is disposed separately from each multichannel optical switch, at a center.

18. A multichannel optical switch in which an optical coupler is joined to a light-signal output end of each light transmission channel in the multichannel optical switches according to claim 13 to collect at least one part of the light transmission channel.

19. A multichannel optical switch in which each output end or each input end of a plurality of the multichannel optical switches according to claim 13 is linked to a plurality of input ends or output ends in at least another multichannel optical switch.

20. The multichannel optical switch according to claim 10, wherein the actuator portion comprises:
- a piezoelectric/electrostrictive element having a piezoelectric/electrostrictive layer and at least one pair of electrodes arranged on one part of the piezoelectric/electrostrictive layer;
- a vibrating member that is in contact with at least one part of the piezoelectric/electrostrictive element to support the piezoelectric/electrostrictive element and that converts strain of the piezoelectric/electrostrictive layer into bending displacement or vibrations; and
- a fixing member to fix at least one part of the vibrating member so as to vibrate the vibrating member.

21. The multichannel optical switch according to claim 20, wherein a substrate of ceramics is constituted by unitarily sintering the vibrating member and the fixing member, and that a recessed portion or a hollow portion is formed in the substrate giving the vibrating member a thin structure.

22. The multichannel optical switch according to claim 20, wherein the piezoelectric/electrostrictive element comprises a laminated body in which an anode layer of linking multiple layers as anodes and a cathode layer of linking multiple layers as cathodes are alternately laminated with a ceramic piezoelectric/electrostrictive layer being positioned therebetween.

23. The multichannel optical switch according to claim 10, wherein the light transmission portion is configured by joining at least two optical wave guiding bodies to one optical wave guiding body so as to form light transmission channels into at least three directions, with the light reflecting plane of the light transmission portion as a starting point.

24. The multichannel optical switch according to claim 10, further comprising a condenser lens or a collimator lens arranged at each of a plurality of input ends and/or output ends of the light transmission portion, and light signals are input and output through the condenser lens or the collimator lens.

25. The multichannel optical switch according to claim 10, wherein the light transmission portion comprises two or more layers having different light refractive indexes.

26. The multichannel optical switch according to claim 10, wherein a light transmission channel comprising an optical wave guiding body is formed at one part of the light transmission portions.

27. The multichannel optical switch according to claim 10, wherein the light reflection member is a light reflecting film that is formed integrally on the light introduction member.

28. The multichannel optical switch according to claim 10, wherein each optical path-changing portion has a light reflection member, and at least two kinds of light reflection angles are shared among the optical path-changing portions.

29. The optical switch according to claim 2, wherein a displacement transmission member is arranged between the optical path-changing portion and the piezoelectric/electrostrictive element, and transmits displacement of the piezoelectric/electrostrictive element to the optical path-changing portion.

30. The optical switch according to claim 20, wherein a displacement transmission member is arranged between the optical path-changing portion and the piezoelectric/electrostrictive element, and transmits displacement of the piezoelectric/electrostrictive element to the optical path-changing portion.

* * * * *

UNITED STATES PATENT AND TRADEMARK OFFICE
CERTIFICATE OF CORRECTION

PATENT NO. : 6,542,658 B2  Page 1 of 1
DATED : April 1, 2003
INVENTOR(S) : Yukihisa Takeuchi, Tsutomu Nanataki and Koji Kimura It is certified that error appears in the above-identified patent and that said Letters Patent is hereby corrected as shown below:

<u>Title page,</u>
Please add Item -- [30] Foreign Application Priority Data
            Dec. 22, 2000   (JP) ………………………….. 2000-391715
            Mar. 1, 2001     (JP) ………………………….. 2001-056740 --

Signed and Sealed this

Twenty-ninth Day of July, 2003

JAMES E. ROGAN
*Director of the United States Patent and Trademark Office*